(12) United States Patent
Hao et al.

(10) Patent No.: US 12,503,442 B2
(45) Date of Patent: Dec. 23, 2025

(54) PHENYL-3,4-DIHYDROISOQUINOLIN-2(1H)-YL-ETHAN-1-ONE DERIVATIVES AS DOPAMINE D1RECEPTOR POSITIVE ALLOSTERIC MODULATORS

(71) Applicant: Eli Lilly and Company, Indianapolis, IN (US)

(72) Inventors: Junliang Hao, Indianapolis, IN (US); Richard D. Johnston, Indianapolis, IN (US); Gregory Lawrence Lackner, Indianapolis, IN (US); Erik J. Hembre, Indianapolis, IN (US); Kjell A. Svensson, Indianapolis, IN (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 490 days.

(21) Appl. No.: 18/030,853

(22) PCT Filed: Oct. 5, 2021

(86) PCT No.: PCT/US2021/053578
§ 371 (c)(1),
(2) Date: Apr. 7, 2023

(87) PCT Pub. No.: WO2022/076418
PCT Pub. Date: Apr. 14, 2022

(65) Prior Publication Data
US 2023/0382869 A1    Nov. 30, 2023

Related U.S. Application Data

(60) Provisional application No. 63/088,479, filed on Oct. 7, 2020.

(51) Int. Cl.
*C07D 217/16* (2006.01)
*A61P 25/16* (2006.01)
*A61P 25/28* (2006.01)

(52) U.S. Cl.
CPC ............ *C07D 217/16* (2013.01); *A61P 25/16* (2018.01); *A61P 25/28* (2018.01)

(58) Field of Classification Search
CPC ............................ A61K 31/4178; A61P 17/02
See application file for complete search history.

(56) References Cited

U.S. PATENT DOCUMENTS

| | | |
|---|---|---|
| 8,962,654 B2 | 2/2015 | Beadle |
| 10,611,751 B2 | 4/2020 | Hilliard |
| 2014/0357664 A1 | 12/2014 | Beadle et al. |
| 2017/0231937 A1 | 8/2017 | Bolsoy |
| 2017/0304292 A1 | 10/2017 | Valade et al. |

FOREIGN PATENT DOCUMENTS

| | | |
|---|---|---|
| CA | 3139622 | 1/2021 |
| WO | 2014091167 A2 | 6/2014 |
| WO | 2014193781 A1 | 12/2014 |
| WO | 2019204418 | 10/2019 |
| WO | 2020257043 | 12/2020 |
| WO | 2021001288 | 1/2021 |
| WO | 2022076418 | 4/2022 |
| WO | 2022192231 | 9/2022 |
| WO | 2022192255 | 9/2022 |

OTHER PUBLICATIONS

PCT/US2021/053578—International Search Report and Written Opinion—Jan. 20, 2022, 11 pages.

Svensson et al., An Allosteric Potentiator of the Dopamine D1 Receptor Increases Locomotor Activity in Human D1 Knock-in Mices without Casusing Stereotypy or Tachyphylaxis. J. Pharmacol. Exp. Ther. (2017) 360:117-128.

Zamek-Gliszczynski MJ, et al., Validation of 96-well equilibrium dialysis with non-radiolabeled drug for definitive measurement of protein binding and application to clinical development of highly-bound drugs., J. Pharm. Sci. (2011) 100: 2498-2507.

Raub TJ, et al., Brain Exposure of Two Selective Dual CDK4 and CDK6 Inhibitors and the Antitumor Activity of CDK4 and CDK6 Inhibition in Combination with Temozolomide in an Intracranial Glioblastoma Xenograft. Drug Metab. Dispos. (2015) 43:1360-71.

Ogu, Chris C., and Maxa, Jan L., Drug interactions due to cytochrome P450, BUMC Proceedings 2000; 13:421-423.

McGinnity DF, et al. (2004) Evaluation of fresh and cryopreserved hepatocytes as in vitro drug metabolism tools for the prediction of metabolic clearance. Drug Metab Dispos 32:1247-1253.

Cannady EA, et al. (2015) Evacetrapib: in vitro and clinical disposition, metabolism, excretion, and assessment of drug Interaction potential with strong CYP3A and CYP2C8 inhibitors. Pharmacol Res Perspect 3:e00179.

(Continued)

*Primary Examiner* — Sahar Javanmard
(74) *Attorney, Agent, or Firm* — Dan L. Wood

(57) ABSTRACT

The invention provides certain (phenyl)-3,4-dihydroisoquinolin-2(1H)-yl)ethan-1-one related compounds of formula I as D1 positive allosteric modulators (PAMs), and pharmaceutical compositions thereof. The invention further provides methods of using a compound of formula I, to treat certain symptoms of dopaminergic CNS disorders including Parkinson's disease, Schizophrenia, ADHD or Alzheimer's disease.

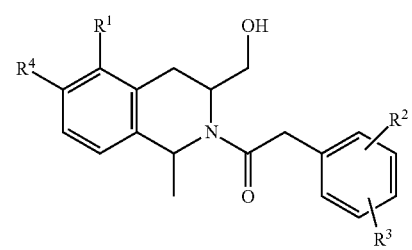

(I)

14 Claims, No Drawings

(56) References Cited

OTHER PUBLICATIONS

Wickremsinhe, et al., "Disposition and metabolism of LY2603618, a Chk-1 inhibitor following intravenous administration in patients with advanced and/or metastatic solid tumors." Xenobiotica 44:827-841. 2014.
Zhou X, et al. (2016), Difference in the Pharmacokinetics and Hepatic Metabolism of Antidiabetic Drugs in Zucker Diabetic Fatty and Sprague-Dawley Rats. Drug Metab Dispos 44:1184-1192.
Burkey JL, et al. (2002) Disposition of LY333531, a selective protein kinase C beta inhibitor, in the Fischer 344 rat and beagle dog. Xenobiotica 32:1045-1052.
Yang J, et al. (2007) Prediction of intestinal first-pass drug metabolism. Curr Drug Metab 8:676-684.
Gertz M, et al. (2010) Prediction of human intestinal first-pass metabolism of 25 CYP3A substrates from in vitro clearance and permeability data. Drug Metab Dispos 38:1147-1158.
Olkkola KT, et al. (1994) Midazolam should be avoided in patients receiving the systemic antimycotics ketoconazole or traconazole. Clin Pharmacol Ther 55:481-485.
Biglan et al., "Safety and Efficacy of Mevidalen in Lewy Body Dementia: A phase II, Randomized, Placebo Controlled Trial", Movement Disorders, vol. 37., No. 3, p. 513-524, 2022.
Hao, et al., "Synthesis and Pharmacological Characterization of 2-(2,6-Dichlorophenyl)-1-((1S,3R)-5-(3-hydroxy-3-methylbutyl)-3-(hydroxymethyl)-1-methyl-3,4-dihydroisoquinolin-2(1H)-yl)ethan-1-one (LY3154207), a Potent, Subtype Selective, and Orally Available Positive Allosteric Modulator of the Human Dopamine D1 Receptor", J. Med. Chem. 2019, 62, 8711-8732.
McCarthy, et al., "The Dopamine D1 Receptor Positive Allosteric Modulator Mevidalen (LY3154207) Enhances Wakefulness in the Humanized D1 Mouse and in Sleep-Deprived Healthy Male Volunteers", J Pharmacol Exp Ther 380:143-152, 2022.
Reagan-Shaw, S., Nihal, M., Ahmad, N. "Dose translation from animal to human studies revisited", FASEB J. 22, 659-661 (2007).
Wang, et al., ""Evaluating the Use of Digital Biomarkers to Test Treatment Effects on Cognition andMovement in Patients with Lewy Body Dementia"", Journal of Parkinson's Disease 12 (2022) 1991-2004.
Wilbraham, et al., ""Safety, Tolerability, and Pharmacokinetics of Mevidalen (LY3154207), a Centrally ActingDopamine D1 Receptor-Positive Allosteric Modulator, in Patients With Parkinson Disease"", Clinical Pharmacology in Drug Development, 2022, 11(3) 324-332.
Wilbraham, et al., "Safety, Tolerability, and Pharmacokinetics of Mevidalen (LY3154207), a Centrally Acting Dopamine D1 Receptor-Positive Allosteric Modulator (D1PAM), in Healthy Subjects", Clinical Pharmacology in Drug Development 2021, 10(4) 393-403.
Kaar Stephen J, et al.: "Antipsychotics: Mechanisms underlying clinical response and side-effects and novel treatment approaches based on pathophysiology", Neuropharmacology, Elsevier, Amsterdam, Nl, vol. 172, Jul. 9, 2019 (2019-07-09), XP086171220, Issn: 0028-3908, Doi: 10.1016/J.NEUROPHARM.2019.107704.

PHENYL-3,4-DIHYDROISOQUINOLIN-2(1H)-YL-ETHAN-1-ONE DERIVATIVES AS DOPAMINE D1RECEPTOR POSITIVE ALLOSTERIC MODULATORS

CROSS-REFERENCE TO RELATED PATENT APPLICATIONS

The present application is the U.S. National Stage of International Patent Application No. PCT/US2021/053578, filed on Oct. 5, 2021, and published in the English language as WO 2022/076418 on Apr. 14, 2022, which application in turn claims the benefit of priority to U.S. Provisional Patent Application No. 63/088,479, filed on Oct. 7, 2020. The contents of the foregoing applications are incorporated herein by reference in their entireties.

The invention provides certain phenyl-3,4-dihydroisoquinolin-2(1H)-yl)ethan-1-one related compounds, pharmaceutical compositions thereof, and methods for their use in the treatment of dopaminergic CNS disorders including Parkinson's disease, Alzheimer's disease, Schizophrenia, and Attention deficit hyperactivity disorder (ADHD).

Many currently used drugs work directly or indirectly through dopamine receptors. These include dopamine agonists and the dopamine precursor L-DOPA for Parkinson's disease, dopamine releasers for attention deficit disorder and narcolepsy, and dopamine reuptake inhibitors for depression. The D1 receptor has an important role in motor activity and reward, and a special role in maintaining higher cognitive functions for working memory, attention, and executive functions (Arnsten A F, Cereb. Cortex (2013) 123, 2269-2281). Attempts to develop D1 agonists for clinical use have so far not been successful, giving impetus to the search for alternative approaches to augmenting D1 receptor activity.

One such approach is to identify an allosteric potentiator, also known as a positive allosteric modulator or PAM, of the dopamine D1 receptor. (Svensson K, et al., *J. Pharmacol. Exp. Ther*. (2017) 360:117-128). Allosteric modulators are agents that either potentiate (Positive Allosteric Modulator, or PAM), or inhibit (Negative Allosteric Modulator, or NAM) the effect of the natural ligand by binding to a site that is distinct from the orthosteric binding site on the receptor (the allosteric binding site). By increasing the affinity of dopamine for the D1 receptor, a D1 potentiator may amplify the response to endogenous dopamine, increasing D1 tone when and where dopamine is released. This mode of activity is in contrast to a D1 agonist, which will activate all D1 receptors to which it has access for as long as it is present. In animal models of cognition and locomotor activity, D1 agonists show bell-shaped dose-response relationships, which are probably due to overstimulation at higher doses. Some D1 agonists also show rapid development of tolerance due to constant activation of the D1 receptor. In contrast, because a D1 potentiator would be dependent on endogenous tone and subject to normal feedback control, it may have a much lower propensity for overstimulation. Given the involvement of dopamine and D1 receptor signaling in these central nervous system functions, a D1 potentiator which can augment D1 receptor activity may provide an alternative and/or improved agent for the treatment of certain dopamine related diseases.

Parkinson's disease is a chronic, progressive, neurodegenerative disorder characterized by the loss of dopaminergic neurons in the brain. Parkinson's disease manifests in resting tremor along with other motor symptoms (e.g. bradykinesia and postural instability) and non-motor symptoms (e.g. cognitive impairment, sleep disorders, and depression). Current therapies for the treatment of Parkinson's disease include administration of non-selective dopamine precursors such as levodopa, and dopamine receptor agonists. Direct acting dopamine receptor agonist therapies may also be associated with impulse control disorders, psychosis, and worsening of cognition, due to their relatively greater affinity for D2 receptors. Schizophrenia is a debilitating disease with complex pathological mechanisms. A component of Schizophrenia is cognitive impairment, which may be associated with a deficiency in D1 receptor activation or D1 receptor down regulation. It has been hypothesized that D1 activation, selective over D2 modulation, may be effective in the treatment of cognitive impairment associated with Schizophrenia. Alzheimer's disease is a chronic, progressive, neurodegenerative disorder characterized by loss of neurons and synapses in the cerebral cortex and certain subcortical regions. Disease progression includes cognitive impairment, which is hypothesized to be due at least in part to reduced D1 receptor activation; such that D1 activation may provide therapeutic benefit in the treatment of cognitive impairment associated with Alzheimer's disease. ADHD is a neurodevelopmental disorder characterized by difficulties with focused attention, excessive activity, or difficulty in controlling one's behavior as appropriate for the person's age. It is hypothesized that D1 activation may provide therapeutic benefit in the treatment of ADHD. Thus, there remains a significant unmet need for safe and effective treatment of cognitive or other neurological impairments associated with Schizophrenia, Parkinson's disease, Alzheimer's disease and/or ADHD, such as alternative and/or improved dopamine D1 receptor positive allosteric modulators (D1 PAM's).

WO 2014/193781 recites certain 3,4-dihydroisoquinolin-2(1H)-yl compounds as D1 PAMs for the treatment of cognitive impairment associated with Parkinson's disease, Alzheimer's disease, Schizophrenia, depression or ADHD.

The present invention provides certain novel compounds that are selective PAMs of the dopamine 1 receptor (D1) and demonstrate an advantageous combination of pharmacological properties, such as potentiation of human D1 receptor signaling in response to dopamine, high oral in vivo availability, and in vivo efficacy in locomotor activation of animals that are habituated to the environment. As such, compounds of the present invention are believed to be useful in the treatment of Parkinson's disease, Alzheimer's disease, Schizophrenia, and/or ADHD. The compounds of the present invention may provide an alternative treatment for such disorders.

The present invention provides a compound of formula I:

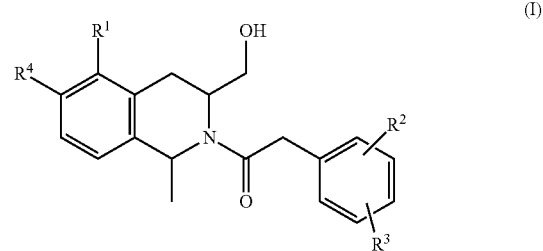

wherein:
R¹ is

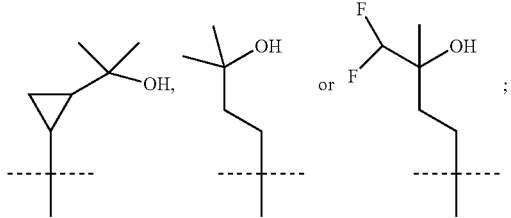

R² is —F or —Cl;
R³ is —F or —Cl; and
R⁴ is —H or —F;
provided that when R¹ is

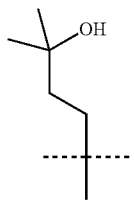

then R4 is —F.

The compounds of formula I are particularly useful in the treatment methods of the invention, but certain configurations are preferred. The following paragraphs describe such preferred configurations. Although the present invention as embodied in formula I contemplates all individual enantiomers and diasteromers, as well as mixtures of enantiomers and/or diastereomers of said compounds, including racemates, compounds with the absolute configuration as set forth below are preferred. It is understood that these preferences are applicable to the treatment methods and to the new compounds of the invention.

A particular embodiment of formula I is a compound of formula Ia:

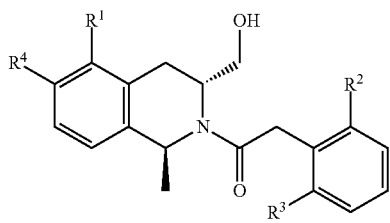

(Ia)

wherein:
R¹ is

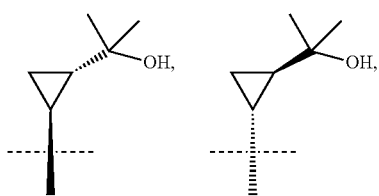

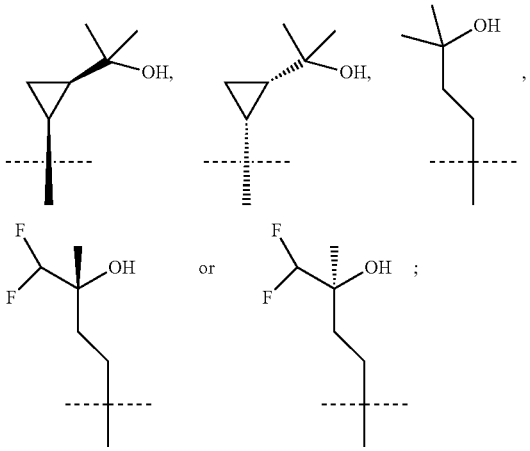

R² is —F or —Cl;
R³ is —F or —Cl; and
R⁴ is —H or —F;
provided that when R¹ is

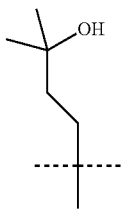

then R4 is —F.

A particular embodiment of formula I is a compound of formula Ib:

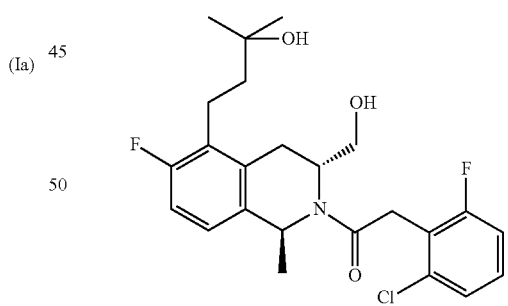

(Ib)

which in the free base form can also be named as 2-(2-chloro-6-fluoro-phenyl)-1-[(1S,3R)-6-fluoro-3-(hydroxymethyl)-5-(3-hydroxy-3-methyl-butyl)-1-methyl-3,4-dihydro-1H-isoquinolin-2-yl]ethanone.

Further, the present invention provides a pharmaceutical composition comprising a compound of formula I, Ia, and/or Ib, and a pharmaceutically acceptable carrier, diluent or excipient.

The following particular embodiments are compounds of formula I or Ia.

The present invention provides a compound which is

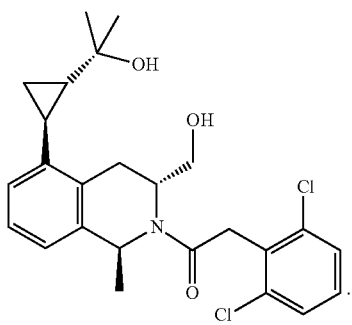

The present invention provides a compound which is

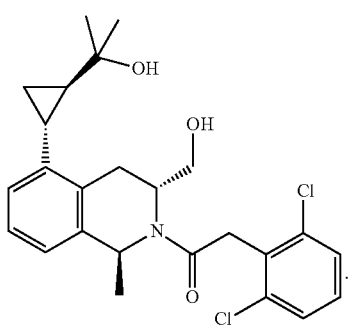 [SMILES: C[C@H]1c2cccc([C@@H]3C[C@H]3C(C)(C)O)c2C[C@H](CO)N1C(=O)Cc1c(Cl)cccc1Cl]

The present invention provides a compound which is

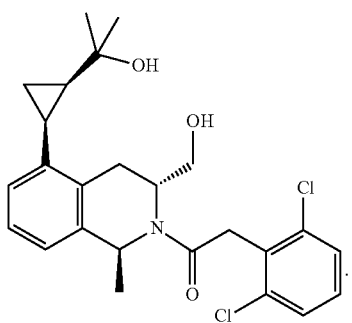 [SMILES: C[C@H]1c2cccc([C@H]3C[C@H]3C(C)(C)O)c2C[C@H](CO)N1C(=O)Cc1c(Cl)cccc1Cl]

The present invention provides a compound which is

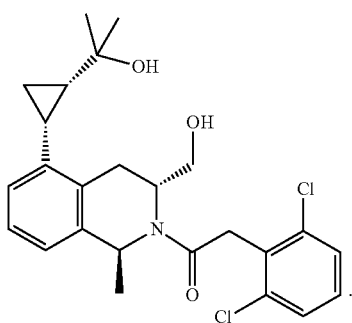 [SMILES: C[C@H]1c2cccc([C@@H]3C[C@@H]3C(C)(C)O)c2C[C@H](CO)N1C(=O)Cc1c(Cl)cccc1Cl]

The present invention provides a compound which is

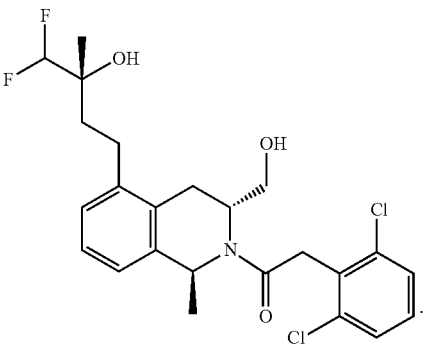 [SMILES: C[C@H]1c2cccc(CC[C@@](C)(O)C(F)F)c2C[C@H](CO)N1C(=O)Cc1c(Cl)cccc1Cl]

The present invention provides a compound which is

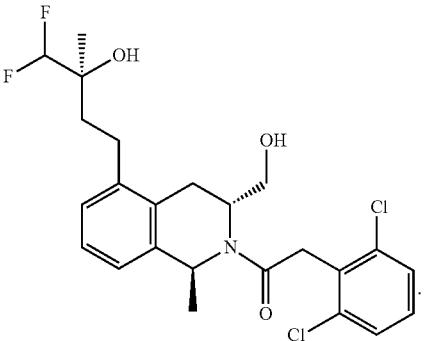 [SMILES: C[C@H]1c2cccc(CC[C@](C)(O)C(F)F)c2C[C@H](CO)N1C(=O)Cc1c(Cl)cccc1Cl]

The present invention provides a compound which is

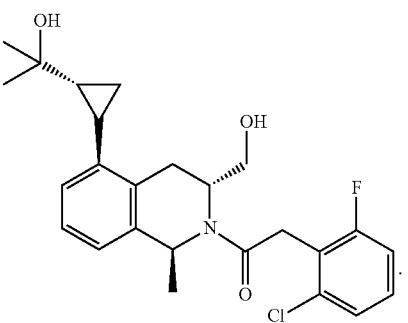

The present invention provides a compound which is

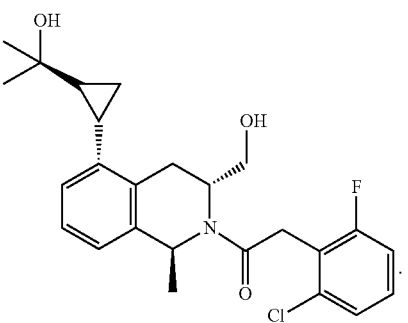

The present invention provides a compound which is

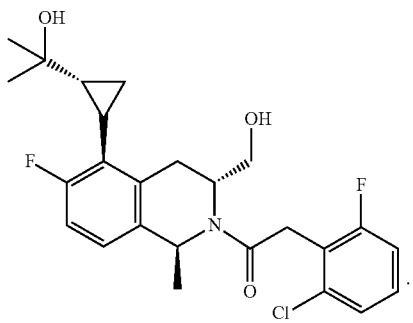

The present invention provides a compound which is

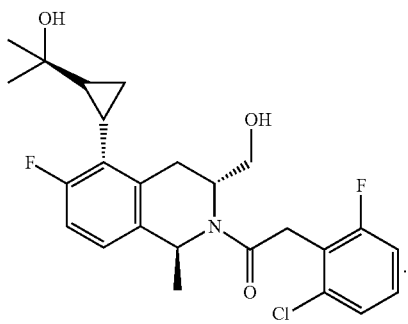

Further, the present invention provides a compound of one of the particular embodiments of the preceding list immediately above, and a pharmaceutically acceptable carrier, diluent or excipient. For example co-crystals are contemplated for the compound embodiments described herein.

Compounds of the present invention are selective PAMs of the dopamine 1 (D1) receptor with minimal activity at the dopamine 2 (D2) receptor. The compounds of present invention may further provide their therapeutic benefits while avoiding risks of drug-drug interactions. As such, compounds of the present invention are believed to be useful for the treatment of conditions in which reduced D1 activity plays a role, and D2 activation is undesirable, such as Parkinson's disease and Schizophrenia, including relief of certain associated symptoms such as motor symptoms and cognitive impairment associated with Parkinson's disease and cognitive impairment and negative symptoms associated with Schizophrenia, as for example mild cognitive impairment or dementia. Compounds of the present invention are also believed to be useful in improving motor symptoms in Parkinson's disease as a monotherapy or in combination with other therapies. Compounds of the present invention are also believed to be useful in treating certain symptoms of Alzheimer's disease such as cognitive impairment, as for example mild cognitive impairment. Further, compounds of the present invention are believed to be useful in treating certain symptoms of ADHD. Compounds of the present invention are also believed to be useful in treating dopaminergic CNS disorders which include Parkinsons Disease, Alzheimers' Disease, Lewy body dementia (LBD), Vascular Dementia, Schizophrenia, ADHD, Depression, Autism, chronic musculoskeletal pain, fibromyalgia, cognitive impairment disorders, sleep disorders, excessive daytime sleepiness, narcolepsy, shift work disorder, traumatic brain injury, chronic traumatic encephalopathy, obesity and appetite regulation, mood disorders, lethargy, apathy, and addiction disorders.

Further, the present invention provides a compound of formula I, for use in therapy. Further, the present invention provides a compound of formula Ia, for use in therapy. Further, the present invention provides a compound of formula Ib, for use in therapy.

In another aspect the present invention provides a pharmaceutical composition comprising the compound of formula I, Ia or Ib, and one or more pharmaceutically acceptable carriers, diluents, or excipients. Furthermore, this aspect, of the invention provides a pharmaceutical composition for treating Parkinson's disease, as for example, cognitive impairment associated with Parkinson's disease, comprising the compound of formula I, Ia or Ib, and one or more pharmaceutically acceptable excipients, carriers, or diluents. In another embodiment of this aspect of the invention, there is provided a pharmaceutical composition for mitigating motor impairment associated with Parkinson's disease, comprising a compound of formula I, Ia or Ib, and one or more pharmaceutically acceptable excipients, carriers, or diluents.

In another embodiment of this aspect of the invention, there is provided a pharmaceutical composition for treating Alzheimer's disease, as for example mitigating cognitive impairment associated with Alzheimer's disease, comprising a compound of formula I, Ia or Ib, and one or more pharmaceutically acceptable excipients, carriers, or diluents.

Another embodiment of this aspect of the invention provides a pharmaceutical composition for treating Schizophrenia, as for example mitigating cognitive impairment associated with Schizophrenia, comprising the compound of formula I, Ia or Ib, and one or more pharmaceutically acceptable excipients, carriers, or diluents.

Another embodiment of present invention provides a pharmaceutical composition for treating ADHD, comprising the compound of formula I, Ia or Ib, and one or more pharmaceutically acceptable excipients, carriers, or diluents.

Further, the present invention provides a method of treating Parkinson's disease, as for example, cognitive impairment associated with Parkinson's disease, or for example, mitigating motor impairment associated with Parkinson's disease, comprising administering to a patient in need thereof an effective amount of a compound of formula I, Ia or Ib.

Further, the present invention provides a method of treating Alzheimer's disease, as for example, cognitive impairment associated with Alzheimer's disease, comprising administering to a patient in need thereof an effective amount of a compound of formula I, Ia or Ib.

Further, the present invention provides a method of treating Schizophrenia, as for example, cognitive impairment associated with Schizophrenia, comprising administering to a patient in need thereof an effective amount of a compound of formula I, Ia or Ib.

Further, the present invention provides a method of treating ADHD, comprising administering to a patient in need thereof an effective amount of a compound of formula I, Ia or Ib.

In one embodiment of this aspect, the present invention provides a compound of formula I, Ia or Ib, for use in the treatment of Parkinson's disease. In one particular embodiment the invention provides a compound of formula I, Ia or Ib, for use in the treatment of cognitive impairment associated with Parkinson's disease. In another particular embodiment the invention provides a compound of formula I, Ia or Ib, for use in mitigating motor impairment associated with Parkinson's disease.

Further, the present invention provides a compound of formula I, Ia or Ib, for use in the treatment of Schizophrenia, as for example in the treatment of cognitive impairment associated with Schizophrenia.

Further, the present invention provides a compound of formula I, Ia or Ib, for use in the treatment of ADHD.

Further, the present invention provides a compound of formula I, Ia or Ib, for use in the treatment of Alzheimer's disease, as for example in the treatment of cognitive impairment associated with Alzheimer's disease.

In yet another aspect, the present invention provides the use of a compound of formula I, Ia or Ib, in the manufacture of a medicament for the treatment of Parkinson's disease, as for example the treatment of cognitive impairment associated with Parkinson's disease, or the mitigation of motor impairment associated with Parkinson's disease.

Further, the present invention provides the use of a compound of formula I, Ia or Ib, in the manufacture of a medicament for the treatment of Schizophrenia, as for example the treatment of cognitive impairment associated with Schizophrenia.

Further, the present invention provides the use of a compound of formula I, Ia or Ib, in the manufacture of a medicament for the treatment of Alzheimer's disease, as for example the treatment of cognitive impairment associated with Alzheimer's disease.

Further, the present invention provides the use of a compound of formula I, Ia or Ib, in the manufacture of a medicament for the treatment of ADHD.

While it is possible to administer compounds employed in the methods of this invention directly without any formulation, the compounds are usually administered in the form of pharmaceutical compositions comprising the compound of formula I, Ia or Ib, as an active ingredient, and at least one pharmaceutically acceptable carrier, diluent and/or excipient. These compositions can be administered by a variety of routes including oral, sublingual, nasal, subcutaneous, intravenous, and intramuscular. Such pharmaceutical compositions and processes for preparing them are well known in the art. See, e.g., Remington: The Science and Practice of Pharmacy (University of the Sciences in Philadelphia, ed., 21st ed., Lippincott Williams & Wilkins Co., 2005).

The compositions are preferably formulated in a unit dosage form, each dosage containing from about 0.5 to about 800 mg of the active ingredient. The term "unit dosage form" refers to physically discrete units suitable as unitary dosages for human subjects and other mammals, each unit containing a predetermined quantity of active material calculated to produce the desired therapeutic effect, in association with at least one suitable pharmaceutically acceptable carrier, diluent and/or excipient. It will be understood that the amount of the compound actually administered will be determined by a physician, in the light of the relevant circumstances, including the condition to be treated, the chosen route of administration, the actual compound administered, the age, weight, and response of the individual patient, and the severity of the patient's symptoms. It is contemplated that the compound of the invention, as for example in a pharmaceutical composition of the invention, will be used to treat Alzheimer's disease, Parkinson's disease and/or Schizophrenia, as for example the treatment of mild cognitive impairment associated with these diseases, by chronic administration.

A compound of the present invention may be used in combination with other drugs that are used in the treatment or amelioration of a dopaminergic CNS disorder. Such other drug(s) may be administered, by a route and in an amount commonly used therefore, contemporaneously or sequentially with a compound of the present invention. For example other active ingredients effective in the treatment of Parkinson's disease that may be combined with a compound of the present invention, include, but are not limited to: (a) dopamine precursors such as levodopa; melevodopa, and etilevodopa; and (b) dopamine agonists, including pramipexole, ropinirole, apomorphine, rotigotine, bromocriptine, cabergoline, and pergolide, (c) monoamine oxidase inhibitors, including selegiline and rasagiline, (d) COMT inhibitors, including tolcapone and entacapone, (e) acetylcholine esterase inhibitors, including rivastigmine and donepezil, (f) antidepressants, including sertraline, citalopram, mirtazapine and trazodone. Further, for example, other active ingredients effective in the treatment of Alzheimers Disease that may be combined with a compound of the present invention, include, but are not limited to: acetylcholinesterase inhibitors including rivastigmine and donepezil, an NMDA antagonist including memantine, certain antipsychotic drugs including risperidone, quetiapine, aripiprazole, olanzapine and pimavanserin, and antidepressants including sertraline, citalopram, mirtazapine and trazodone.

As used herein, the term "patient" refers to a mammal, as for example a human, in need of treatment for a disorder or disease. A human is a preferred patient. As used herein, patients which are treated by the compounds of the present invention suffer from a dopaminergic CNS disorder, and as such share etiophathological aspects in that disturbances of dopamine signaling are known to contribute to these diseases. As used herein dopaminergic CNS disorders include Parkinsons Disease, Alzheimers' Disease, Lewy body dementia (LBD), Vascular Dementia, Schizophrenia, ADHD, Depression, Autism, chronic musculoskeletal pain, fibromyalgia, cognitive impairment disorders, sleep disorders, excessive daytime sleepiness, narcolepsy, shift work disorder, traumatic brain injury, chronic traumatic encephalopathy, obesity and appetite regulation, mood disorders, lethargy, apathy, and addiction disorders. Identification of patients with these dopaminergic CNS disorders can be achieved by established methods known to the skilled artisan.

The present invention provides a method for use of a compound of formula I, Ia, or Ib in simultaneous, separate, or sequential combination with a dopamine precursor in the treatment of a dopaminergic disorder in a patient. The present invention provides a method for use of a compound of formula I, Ia, or Ib in simultaneous, separate, or sequential combination with a dopamine precursor in the treatment of Parkinson's disease in a patient. The present invention provides a method for use of a compound of formula I, Ia, or Ib in simultaneous, separate, or sequential combination with a dopamine precursor in the treatment of Alzheimers' disease in a patient.

The present invention provides a method for use of a compound of formula I, Ia, or Ib in simultaneous, separate, or sequential combination with a dopamine agonist in the treatment of a dopaminergic disorder in a patient. The present invention provides a method for use of a compound of formula I, Ia, or Ib in simultaneous, separate, or sequential combination with a dopamine agonist in the treatment of Parkinson's disease in a patient. The present invention provides a method for use of a compound of formula I, Ia, or Ib in simultaneous, separate, or sequential combination with a dopamine agonist in the treatment of Alzheimers' disease in a patient.

In embodiments of the invention a patient is a human who has been diagnosed as having a medical risk, condition or disorder, such as a dopaminergic CNS disorder, in need of treatment with a dosing regimen described herein. In those instances where the disorders which can be treated by the methods of the present invention are known by established and accepted classifications, such as AD, PD, LBD, their classifications can be found in various well-known medical texts. For example, at present, the 5th edition of the Diagnostic and Statistical Manual of Mental Disorders (DSM-5), provides a diagnostic tool for identifying many of the disorders described herein. Also, the International Classification of Diseases, Tenth Revision (ICD-10), provides classifications for many of the disorders described herein. The skilled artisan will recognize that there are alternative nomenclatures, nosologies, and classification systems for disorders described herein, including those as described in the DSM-5 and ICD-10, and that terminology and classification systems evolve with medical scientific progress. Cognitive impairment in subjects with Parkinson's disease is commonly referred to as neurocognitive disorder. Diagnostic criteria in DSM-5 (5th edition of the Diagnostic and Statistical Manual of Mental Disorders) describe evidence of significant cognitive decline from a previous level of performance (concern of individual or informant documented by neuropsychological testing), and the cognitive deficits may or may not interfere with independence in everyday activities. This is qualified as major or mild neurocognitive disorder. "Weight loss" as used herein refers to a reduction in body weight, and/or to chronic weight management wherein treatment promotes maintenance of body weight within a desired range.

As used herein, the terms "treatment", "treating", or "mitigating" are intended to refer to all processes wherein there may be a slowing, interrupting, arresting, controlling, or stopping of the progression of an existing disorder and/or a reduction in symptoms thereof, but does not necessarily indicate a total elimination of all symptoms.

As used herein, the term "effective amount" of a compound of formula I, Ia or Ib refers to an amount, that is a dosage, which is effective in potenitiating a dopamine mediated response in a patient. A preferred "effective amount" can be determined as an amount that can promote a wakeful or alert state in the patient as compared to the patient when untreated. In determining an effective amount or dose of a compound of formula I, Ia or Ib, a number of factors are considered, including, but not limited to the compound to be administered and its particular formulation; the patients size, age, and general health; the degree of involvement or the severity of the disorder; the response of the individual patient; the mode of administration; and other relevant circumstances.

Abbreviations used herein are defined as follows:
"Bn" refers to benzyl.
"CAS #" refers to Chemical Abstracts Registry number.
"crotyl" refers to but-2-en-1-yl.
"CNS" refers to central nervous system.
"1D-NOESY" refers to one-dimensional Nuclear Overhauser Effect NMR_spectroscopy.
"DCM" refers to dichloromethane or methylene chloride.
"DIPEA" refers to N,N-diisopropylethylamine.
"dmso-$d_6$" refers to fully deuterated dimthylsulfoxide.
"ee" refers to enantiomeric excess.
"ESMS" refers to electrospray mass spectrometry.
"EtOAc" refers to ethyl acetate.
"h" refers to hour or hours.
"HATU" refers to 1-[bis(dimethylamino)methylene]-1H-1,2,3-triazolo[4,5-b]pyridinium 3-oxid hexafluorophosphate or N-[(dimethylamino)-1H-1,2,3-triazolo-[4,5-b]pyridin-1-ylmethylene]-N-methylmethanaminium hexafluorophosphate N-oxide.
"HPLC" refers to high performance liquid chromatography.
"LAH" refers to lithium aluminum hydride.
"MeOH" refers to methanol or methyl alcohol.
"min" refers to minute or minutes.
"NMR" refers to nuclear magnetic resonance spectroscopy.
"PG" refers to protecting group.
"Ph" refers to phenyl.
"OAc" refers to acetate.
"rac-" refers to racemic or racemate.
"RT" refers to room temperature or ambient temperature.
"SFC" refers to supercritical fluid chromatography.
"TBDMS" refers to tert-butyldimethylsilyl.
"TBDPS" refers to tert-butyldiphenylsilyl.
"THF" refers to tetrahydrofuran.
"$t_R$" refers to retention time.
"w/w" refers to weight for weight or weight by weight as a unit of mass.
"wt %" refers to percentage by weight.
"Z" refers to benzyloxycarbonyl, —C(O)OCH$_2$Ph, as protecting group

GENERAL CHEMISTRY

The compounds of the present invention can be prepared by general methods known and appreciated in the art or by processes described herein. Suitable reaction conditions for the steps of these schemes are well known in the art and appropriate substitutions of solvents and co-reagents are within the skill of the art. Likewise, it will be appreciated by those skilled in the art that synthetic intermediates may be isolated and/or purified by various well known techniques as needed or desired, and that frequently, it will be possible to use various intermediates directly in subsequent synthetic steps with little or no purification. Furthermore, the skilled artisan will appreciate that in some circumstances, the order in which moieties are introduced is not critical.

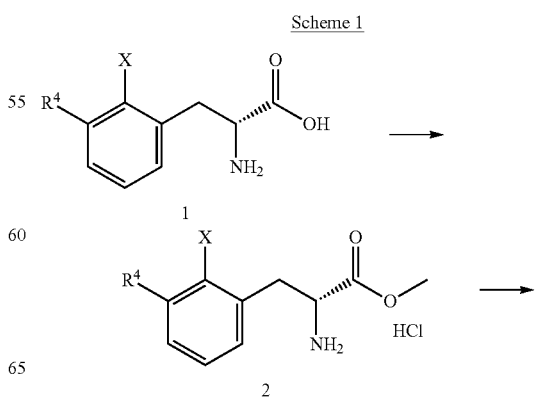

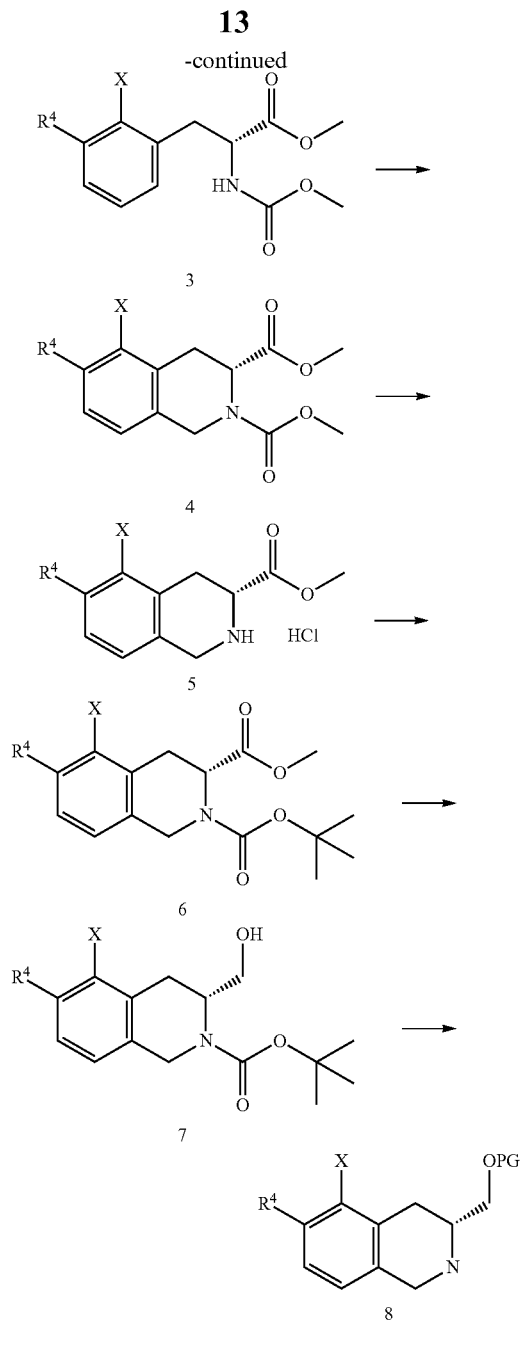

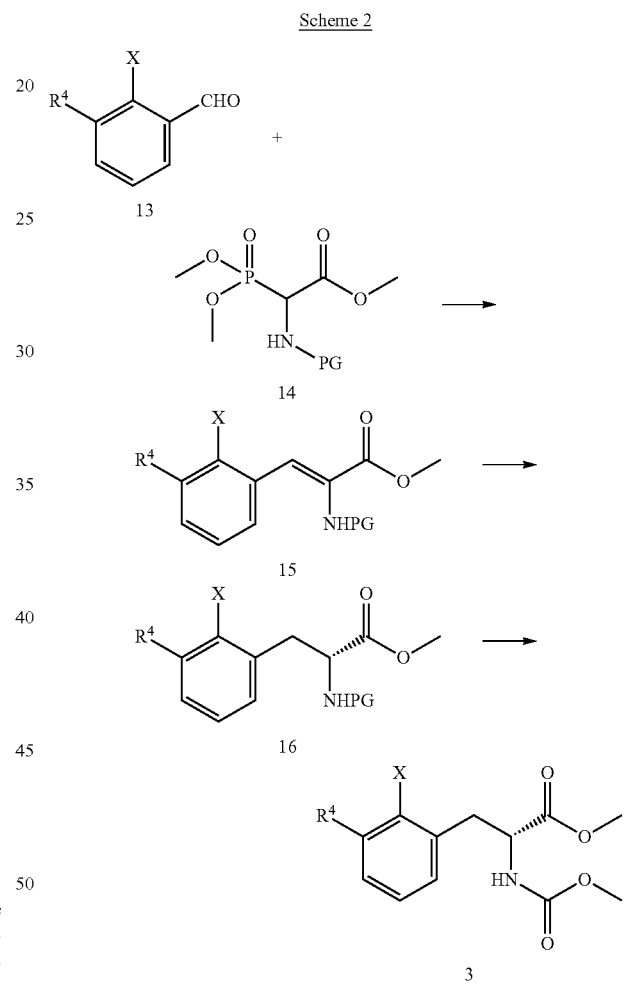

Scheme 1 depicts the preparation of compound 8. One skilled in the art will recognize the appropriately disubstituted phenylalanine 1 (e.g., X=Br, Cl, I; R$^4$=H, F), dissolved in a polar protic solvent may be esterified with a suitably strong acid to obtain the esterified salt 2. Subsequent acylation by washing the salt with aqueous base to obtain the free base, dissolving in an aprotic solvent, and adding the appropriate acid chloride may be accomplished to obtain 3. Cyclization of the 2-substituted N-acylated phenylalanine methyl ester 3 by treatment with paraformaldehyde in an appropriate strong acid and stirring to obtain the tetrahydroisoquinoline 4 is well known in the art. Demethylation and decarboxylation may be achieved by treatment with aqueous acid and stirring under reflux, to obtain 5 as the corresponding amine salt. One skilled in the art will recognize that N-protected tetrahydroisoquinoline 6 may be formed by dissolving amine salt 5 in the appropriate polar aprotic solvent, adding base and the suitable anhydride or alkyl chloroformate to obtain tertbutyl carbamate 6. Subsequent reduction to the methanol derivative 7 may be effected using an array of reducing agents, such as with a metal hydride, borohydride salt, or diborane in a polar aprotic solvent. O-protected tetrahydroisoquinoline 8 may be achieved by first treating the N-protected tetrahydroisoquinoline 7 with the appropriate strong acid and concentrating under vacuum. Thereafter, the amine salt may be dissolved in the appropriate aprotic solvent, treated with base and a suitable protecting group (PG) (e.g., PG=OSi, OBn, OMOM, etc.) to provide 8. For example, protecting the primary alcohol with an acid stable silyl group such as TBDMS or TBDPS, is well known in the art.

Scheme 2 illustrates an alternative the preparation of requisite substituted intermediate 3 (e.g., X=Br, Cl, I; R$^4$=F). One skilled in the art will recognize that Horner-Wadsworth-Emmons condensation between an appropriately disubstituted benzaldehyde 13 (R$^4$=F) and an N-protected amino-2-dimethoxyphosphoryl acetate 14 may be used to prepare ene-carbamate 15 (e.g., PG=Z). Subsequent chiral reduction under H$_2$ with an appropriate chiral auxiliary, for example, with a Rh(I) transition metal catalyst, as is well described in the art, to obtain N-protected 16. Swapping out N-protecting groups may be accomplished under a variety of conditions recognizable to one skilled in the art to obtain 3. Subsequent transformations on compound 3 may be performed as in Scheme 1 to provide compound 8 (e.g., X=Br, Cl, I; R⁴=F).

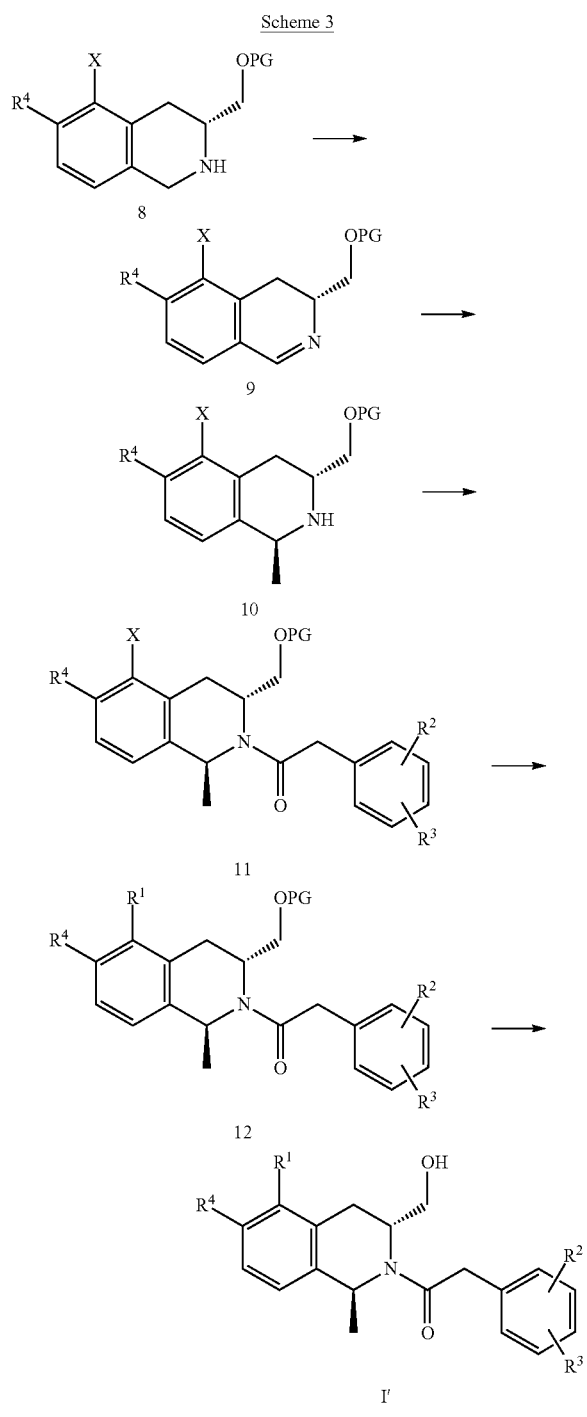

Scheme 3 depicts the synthesis of the compounds of type I'. Imine formation from the tetrahydroisoquinoline 8 may be accomplished under various oxidative conditions recognizable to the skilled artisan, specifically halogenation of the secondary amine and subsequent elimination with a suitably strong base to provide dihydroisoquinoline 9. A stereoselective Grignard reaction may be used by treating the imine 9 with a suitable alkylmagnesium halide to obtain the trans tetrahydroisoquinoline 10. Relative configuration of the tetrahydroisoquinoline 10 may be determined with the appropriate NMR spectroscopic experiment, specifically 1D-NOESY. Subsequent N-acylation may be achieved with amide coupling techniques well known in the art, e.g., benzotriazol-1-yl-oxytripyrrolidinophosphonium hexafluorophosphate in the presence of a mild non-nucleophilic base, to prepare compound 11. Carbon-carbon bond formation using the appropriately substituted compound 11 (e.g., X=Br, Cl, I, etc.) may be effected under transition metal catalysis, such as using Pd, Pt, Ni, or Cu, with an appropriate boronic ester or trifluoroboranuide salt, as is well known in the art. Alternatively, coupling under Heck- or Sonogashira-type conditions with an appropriately substituted alkene or alkyne, respectively, may be achieved as is well known in the art. For example, palladium-mediated cross-coupling 11 with an appropriately substituted cyclopropyl trifluoroboranuide may be accomplished to obtain substituted cyclopropyl compounds of type 12. Additionally, palladium-mediated cross-coupling 11 with an appropriately substituted alkene may be accomplished to obtain alkyl substituted compounds of type 12. The skilled artisan will recognize that the deprotection of the protected alcohol 12, wherein PG=OSi, OBn, OMOM etc., may be executed under a variety of conditions. For example, a silyl protecting group may be removed with tetrabutylammonium fluoride, to obtain the chiral compounds of type I'.

In the following illustrative preparations and examples, solvents are generally removed under reduced pressure (evaporated). In some procedures indicated yields are representative crude yields for products which are isolated by evaporation or filtration and used directly without further purification. Relative stereochemistry around the described tetrahydroisoquinoline framework has been identified by appropriate NMR spectroscopy, specifically 1D-NOESY. In the instances of configuration around substituted cyclopropyl groups in side chain substitutions, the relative configuration is described without determination of the absolute stereochemistry. In the instances of other additional chiral centers in side chain substitutions, the absolute configuration has not been determined. In both of these instances, the diastereomeric pairs are named as "Isomer 1" or "Isomer 2" when separated by chiral chromatographic techniques.

Preparation 1

Methyl 2-bromo-D-phenylalaninate hydrochloride

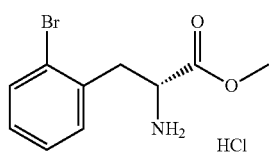

2-Bromo-D-phenylalanine (22.4 g, 91.8 mmol) is dissolved in MeOH (459 mL). Acetyl chloride (65.3 mL, 917.7 mmol) is added at room temperature and the resulting reaction mixture is stirred for 36 h. The reaction mixture is concentrated under reduced pressure to give the title compound (27.2 g, >99% yield). ESMS (m/z) 258/260 [M−Cl, ⁷⁹Br/⁸¹Br].

Preparation 2

Methyl 2-bromo-N-(methoxycarbonyl)-D-phenylalaninate

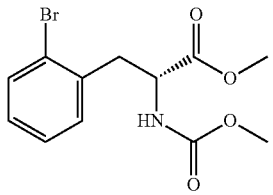 [SMILES: COC(=O)N[C@H](Cc1ccccc1Br)C(=O)OC]

Methyl 2-bromo-D-phenylalaninate hydrochloride (27.2 g, 92.3 mmol) is dissolved in a biphasic mixture of DCM (923 mL) and water (185 mL). NaHCO$_3$ (31 g, 369.4 mmol) and methyl chloroformate (7.9 mL, 101.6 mmol) are added at RT and the resulting mixture is stirred for 2.5 h. The mixture is diluted with water and extracted with DCM. The organic extracts are dried over Na$_2$SO$_4$, filtered, and the filtrate is concentrated under reduced pressure. The resulting residue is purified by flash chromatography on silica gel, eluting with a gradient of 10-75% EtOAc in hexanes to give the title compound (29.1 g, >99% yield) after solvent evaporation of the desired chromatographic fractions. ESMS (m/z): 316/318 [M+H, $^{79}$Br/$^{81}$Br].

Preparation 3

Dimethyl (3R)-5-bromo-3,4-dihydro-1H-isoquinoline-2,3-dicarboxylate

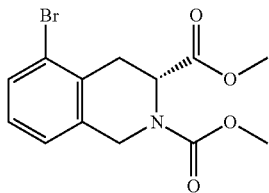 [SMILES: COC(=O)[C@H]1Cc2c(Br)cccc2CN1C(=O)OC]

A mixture of methyl 2-bromo-N-(methoxycarbonyl)-D-phenylalaninate (29.1 g 92.1 mmol) and paraformaldehyde (9.13 g, 101.3 mmol) is stirred in glacial acetic acid (115 mL, 2 mol) containing concentrated H$_2$SO$_4$ (38.4 mL, 719.9 mmol) at RT for 7 hr. The reaction mixture is partitioned between water and EtOAc, the layers are separated, and the aqueous layer is extracted with EtOAc. The combined organic extracts are dried over Na$_2$SO$_4$, filtered, and the filtrate is concentrated under reduced pressure. The resulting residue is purified by flash chromatography on silica gel, eluting with a gradient of 5-40% EtOAc in hexanes, to give the title compound (27.6 g, 91% yield) after solvent evaporation of the desired chromatographic fractions. ESMS (m/z): 328/330 [M+H, $^{79}$Br/$^{81}$Br].

Preparation 4

Methyl (3R)-5-bromo-1,2,3,4-tetrahydroisoquinoline-3-carboxylate hydrochloride

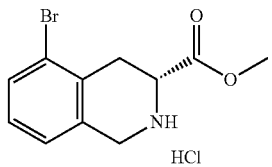

Dimethyl (3R)-5-bromo-3,4-dihydro-1H-isoquinoline-2,3-dicarboxylate (27.6 g, 84 mmol) is dissolved in 5 N HCl (330.6 mL, 1.7 mol) and the resulting mixture is heated to reflux for three days. The mixture is concentrated under reduced pressure to give a white solid. The solid is collected by filtration, washed with diethyl ether, and dried under vacuum at 40° C. overnight to give (3R)-5-bromo-1,2,3,4-tetrahydroisoquinoline-3-carboxylic acid hydrochloride (1:1) (20.8 g, 71.1 mmol). Acetyl chloride (50.6 mL, 711.0 mmol) is added to a 0° C. mixture of (3R)-5-bromo-1,2,3,4-tetrahydroisoquinoline-3-carboxylic acid hydrochloride (1:1) (20.8 g, 71.1 mmol) in MeOH (474 mL). The mixture is warmed to RT and stirred for 36 h. The mixture is concentrated under reduced pressure and dried to give the title compound (21.9 g, 85% yield). ESMS (m/z): 270/272 [M−Cl, $^{79}$Br/$^{81}$Br].

Preparation 5

2-tert-Butyl-3-methyl-(3R)-5-bromo-3,4-dihydro-1H-isoquinoline-2,3-dicarboxylate

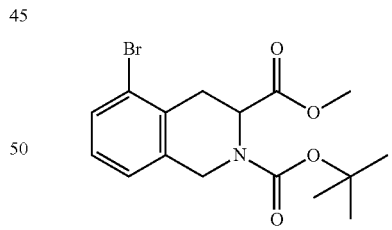

Methyl (3R)-5-bromo-1,2,3,4-tetrahydroisoquinoline-3-carboxylate hydrochloride (21.0 g, 68.5 mmol) is dissolved in 1,4-dioxane (685 mL). Saturated aqueous NaHCO$_3$ (685 mL, 17.5 mol) and di-tert-butyldicarbonate (29.9 g, 137.0 mmol) are added at RT and the biphasic mixture is stirred at RT for 90 min. The mixture is extracted with EtOAc, and the organic extracts are dried over Na$_2$SO$_4$, filtered, and the filtrate is concentrated under reduced pressure. The resulting residue is purified by flash chromatography on silica gel, eluting with a 5-50% gradient of EtOAc in hexanes, to give the title compound (19.5 g, 77% yield) after solvent evaporation of the desired chromatographic fractions. MS (m/z): 270/272 [M−Boc+H, $^{79}$Br/$^{81}$Br].

Preparation 6 tert-Butyl (3R)-5-bromo-3-(hydroxymethyl)-3,4-dihydro-1H-isoquinoline-2-carboxylate

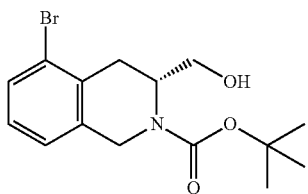 [SMILES: CC(C)(C)OC(=O)N1Cc2cccc(Br)c2C[C@@H]1CO]

A 2 M solution of lithium borohydride (99.4 mL, 198.8 mmol) in THF and MeOH (10.1 mL, 248.5 mmol) are added to a solution of 2-tert-butyl-3-methyl-(3R)-5-bromo-3,4-dihydro-1H-isoquinoline-2,3-dicarboxylate (18.4 g, 49.7 mmol) in THF (497 mL) and the resulting mixture is stirred at RT for 40 min. The reaction is quenched with water and extracted with EtOAc. The organic extracts are separated, dried over $Na_2SO_4$, filtered, and the filtrate is concentrated under reduced pressure. The resulting residue is purified by flash chromatography on silica gel, eluting with a gradient of 5-80% EtOAc in hexanes. The solvent is evaporated from the desired chromatographic fractions, and the resulting residue is dried under high vacuum overnight to give the title compound as a white solid (19.1 g, >99% yield). ESMS (m/z): 286/288 [M-$^t$Bu+H, $^{79}$Br/$^{81}$Br].

Preparation 7

[(3R)-5-Bromo-1,2,3,4-tetrahydroisoquinolin-3-yl]methoxy-tert-butyl-dimethyl-silane

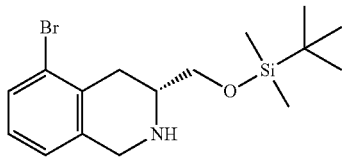 [SMILES: CC(C)(C)[Si](C)(C)OC[C@H]1Cc2c(Br)cccc2CN1]

Trifluoroacetic acid (75.5 mL, 998.3 mmol) is added to solution of tert-butyl (3R)-5-bromo-3-(hydroxymethyl)-3,4-dihydro-1H-isoquinoline-2-carboxylate (15.5 g, 45.3 mmol) in DCM (226 mL) at room temperature. The reaction mixture is stirred at RT for 30 min and concentrated under reduced pressure. The resulting residue is dried under vacuum to give [(3R)-5-bromo-1,2,3,4-tetrahydroisoquinolin-3-yl]methanol 2,2,2-trifluoroacetic acid as a wet solid. [(3R)-5-bromo-1,2,3,4-tetrahydroisoquinolin-3-yl]methanol 2,2,2-trifluoroacetic acid is dissolved in DCM (753 mL). 1H-imidazole (51.3 g, 753 mmol), N,N-dimethyl-4-pyridinamine (460 mg, 3.77 mmol), and t-butyldimethylchlorosilane (13.6 g, 90.4 mmol) are added, and the resulting mixture is stirred at RT overnight. A saturated NH$_4$Cl solution is added and the mixture is extracted with DCM. The DCM layer is separated, dried over Na$_2$SO$_4$, and filtered, and the filtrate is concentrated under reduced pressure. The crude product is combined from a substantially same reaction run with of tert-butyl (3R)-5-bromo-3-(hydroxymethyl)-3,4-dihydro-1H-isoquinoline-2-carboxylate (6.6 g, 19.4 mmol). The combined crude product is purified by flash chromatography on silica gel, eluting with a 5-40% gradient of EtOAc in hexanes, to give the title compound (14.3 g, 89% yield) after solvent evaporation of the desired chromatographic fractions. ESMS (m/z): 356/358 [M+H, $^{79}$Br/$^{81}$Br].

Preparation 8

[(3R)-5-Bromo-3,4-dihydroisoquinolin-3-yl]methoxy-tert-butyl-dimethyl-silane

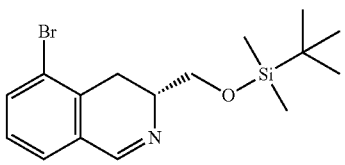 [SMILES: CC(C)(C)[Si](C)(C)OC[C@H]1Cc2c(Br)cccc2C=N1]

[(3R)-5-bromo-1,2,3,4-tetrahydroisoquinolin-3-yl]methoxy-tert-butyl-dimethyl-silane (4.2 g, 11.8 mmol) is dissolved in diethyl ether (118 mL). and N-chlorosuccinimide (2.36 g, 17.7 mmol) is added. The resulting mixture is stirred at RT for 30 min and concentrated under reduced pressure. The resulting residue in is dissolved in a 5% solution of KOH in MeOH (42.0 mL, 30.3 mmol) and stirred for 30 min at RT. The mixture is poured into water and extracted with DCM. The DCM extracts are dried over Na$_2$SO$_4$ and filtered, and the filtrate is concentrated under reduced pressure. The resulting residue is purified by flash chromatography on silica, eluting with a gradient of 5-100% EtOAc in hexanes, to obtain the title compound (3.40 g, 82% yield). ESMS (m/z): 354/356 [M+H, $^{79}$Br/$^{81}$Br].

Alternatively, N-chlorosuccinimide (106.7 g, 790 mmol) is added to a solution of [(3R)-5-bromo-3,4-dihydroisoquinolin-3-yl]methoxy-tert-butyl-dimethyl-silane (220 g, 520 mmol) in THF (3.85 L) at RT in an appropriate vessel with stirring for 30 min. The mixture is concentrated under reduced pressure and the residue is dissolved in 5% w/w KOH in methanol (2.2 L, 1.7 moles) with stirring at RT for 30 min. The mixture is added to water (3 L) and extracted three times with DCM (3×1 L). The combined organic extracts are dried over anhydrous MgSO$_4$ and filtered, and the filtrate is concentrated under reduced pressure to give the title compound (210 g, >99% yield). ESMS (m/z): 354/356 [M+H, $^{79}$Br/$^{81}$Br].

Preparation 9

[(1S,3R)-5-Bromo-1-methyl-1,2,3,4-tetrahydroisoquinolin-3-yl]methoxy-tert-butyl-dimethyl-silane

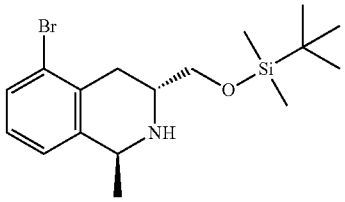 [SMILES: C[C@@H]1N[C@@H](CO[Si](C)(C)C(C)(C)C)Cc2c(Br)cccc21]

[(3R)-5-bromo-3,4-dihydroisoquinolin-3-yl]methoxy-tert-butyl-dimethyl-silane (3.4 g, 9.6 mmol) is dissolved in diethyl ether (160 mL) and cooled to −78° C. in a dry ice-acetone bath. A 3M solution of methylmagnesium chloride in THF (26.9 mL, 80.6 mmol) is added dropwise. The mixture is warmed slowly to RT and stirred overnight. The reaction mixture is slowly quenched by the addition of saturated NH$_4$Cl solution. The resulting mixture is extracted with DCM, dried over NaSO$_4$, and filtered, and the filtrate is concentrated under reduced pressure. The crude product is combined with material from a substantially same reaction run with 1.7 mmol of [(3R)-5-bromo-3,4-dihydroisoquinolin-3-yl]methoxy-tert-butyl-dimethyl-silane. The combined residues are purified by flash chromatography on silica, eluting with a gradient of 5-65% EtOAc in hexanes, to obtain the title compound (3.78 g, >99% yield) after solvent evaporation of the desired chromatographic fractions. ESMS (m/z): 370/372 [M+H, $^{79}$Br/$^{81}$Br].

The relative configuration of compound [(1S,3R)-5-bromo-1-methyl-1,2,3,4-tetrahydroisoquinolin-3-yl]methoxy-tert-butyl-dimethyl-silane is determined by NMR spectroscopy using 1D-NOESY. Selective excitation of the methyl group at 1.30 ppm gives rise to a NOE for Ha at 3.11 ppm. This NOE enhancement is only consistent with a configuration in which the methyl and Ha are on the same side of the ring (trans isomer) because in the cis isomer the methyl protons are too far away from Ha to show an NOE. Since the absolute chemistry for position 3 is known to be R, then the absolute chemistry at position 1 is deduced to be S.

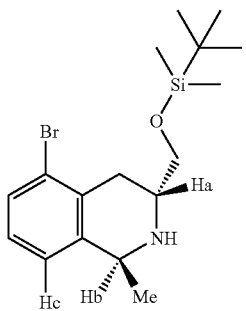

Preparation 10

1-[(1S,3R)-5-bromo-3-[[tert-butyl(dimethyl)silyl]oxymethyl]-1-methyl-3,4-dihydro-1H-isoquinolin-2-yl]-2-(2,6-dichlorophenyl)ethanone

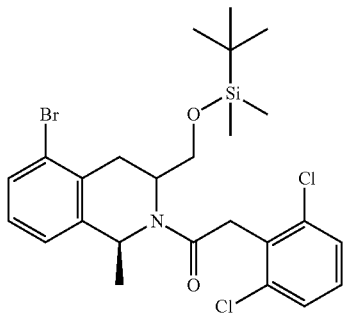 [SMILES: C[C@H]1c2cccc(Br)c2CC(CO[Si](C)(C)C(C)(C)C)N1C(=O)Cc1c(Cl)cccc1Cl]

2,6-Dichlorophenylacetic acid (3.7 g, 18 mmol) is combined with [(1S,3R)-5-bromo-1-methyl-1,2,3,4-tetrahydroisoquinolin-3-yl]methoxy-tert-butyl-dimethyl-silane (5 g, 13.5 mmol), HATU (7.7 g, 20 mmol) and DIPEA (7.1 mL, 41 mmol) in DCM (70 mL). The mixture is stirred under a blanket of nitrogen at RT for 2 h. The reaction solution is concentrated under reduced pressure and the resulting residue is purified by flash chromatography on silica gel, eluting with a gradient of 0-25% EtOAc in hexanes to give the title compound (6.2 g, 81% yield) after solvent evaporation of the desired chromatographic fractions. ESMS (m/z): 558 (M+1).

Preparation 11 trans-Ethyl-2-[(1S,3R)-3-[[tert-butyl(dimethyl)silyl]oxymethyl]-2-[2-(2,6-dichlorophenyl)acetyl]-1-methyl-3,4-dihydro-1H-isoquinolin-5-yl]cyclopropanecarboxylate

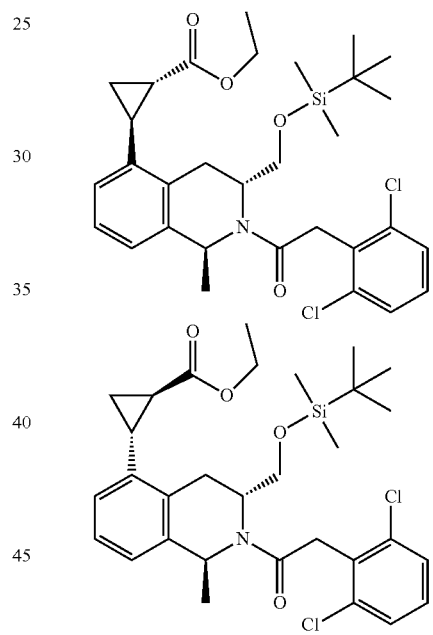

1-[(1S,3R)-5-bromo-3-[[tert-butyl(dimethyl)silyl]oxymethyl]-1-methyl-3,4-dihydro-1H-isoquinolin-2-yl]-2-(2,6-dichlorophenyl)ethanone (500 mg, 0.9 mmol) is combined with potassium [trans-2-ethoxycarbonylcyclopropyl]-trifluoro-boranuide (300 mg, 1.3 mmol; see PCT/FR2013/053057), KH$_2$PO$_4$ (370 mg, 2.7 mmol), and 1,1'-bis(diphenylphosphino)ferrocene-palladium(II)dichloride dichloromethane complex (115 mg, 0.1 mmol) in 1,4-dioxane (8 mL, 93.2 mmol) and water (2 mL) in a microwave vial. The vial is capped, purged with nitrogen, and irradiated at 120° C. in a microwave for 2 h. The reaction solution is concentrated under reduced pressure and the resulting residue is purified by flash chromatography on silica gel, eluting with a gradient of 0-25% EtOAc in hexanes, to give the title compound as a mixture of trans isomers (245 mg, 46% yield) after solvent evaporation of the desired chromatographic fractions. ESMS (m/z). 590 (M+1).

Preparation 12

1-[(1S,3R)-3-[[tert-Butyl(dimethyl)silyl]oxymethyl]-5-[trans-2-(2-hydroxy-2-methyl-propyl)cyclopropyl]-1-methyl-3,4-dihydro-1H-isoquinolin-2-yl]-2-(2,6-dichlorophenyl)ethanone

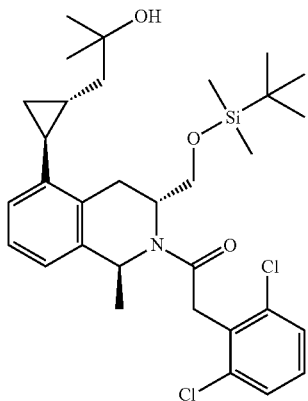

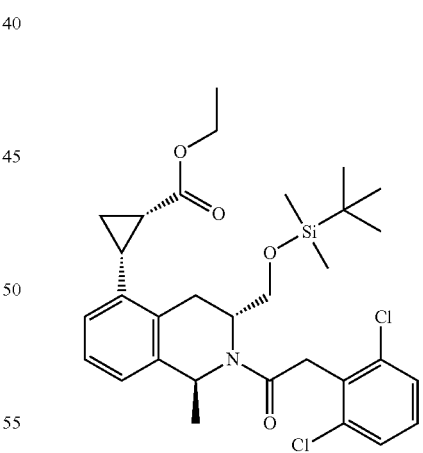

trans-Ethyl 2-[(1S,3R)-3-[[tert-butyl(dimethyl)silyl]oxymethyl]-2-[2-(2,6-dichlorophenyl)acetyl]-1-methyl-3,4-dihydro-1H-isoquinolin-5-yl]cyclopropanecarboxylate (240 mg, 0.4 mmol) is stirred in THF (4 ml) and is cooled to 0° C. A 3 M solution of methylmagnesium chloride in THF (1.75 mL, 5.25 mmol) is added dropwise via syringe at 0° C. over 5 min. The resulting mixture is stirred under nitrogen for 1 h, quenched with saturated aqueous NH₄Cl, and extracted with EtOAc. The organic layer is separated, dried over Na₂SO₄, filtered, and the resulting filtrate is concentrated under reduced pressure to obtain the title compound as a mixture of trans isomers around the cyclopropyl substituent, suitable for use without additional purification. ESMS (m/z): 576 (M+1).

Preparation 13 cis-Ethyl 2-[(1S,3R)-3-[[tert-butyl(dimethyl)silyl]oxymethyl]-2-[2-(2,6-dichlorophenyl)acetyl]-1-methyl-3,4-dihydro-1H-isoquinolin-5-yl]cyclopropanecarboxylate

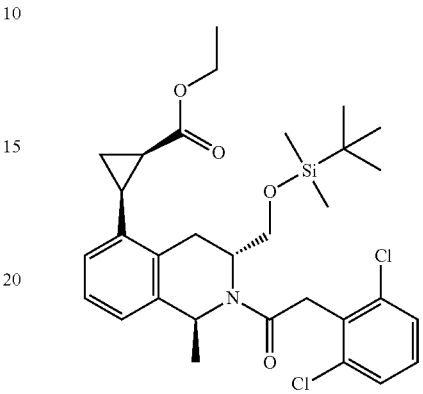

Using essentially the method described in Preparation 2, 1-[(1S,3R)-5-bromo-3-[[tert-butyl(dimethyl)silyl]oxymethyl]-1-methyl-3,4-dihydro-1H-isoquinolin-2-yl]-2-(2,6-dichlorophenyl)ethanone (500 mg, 0.9 mmol) is combined with potassium [cis-2-ethoxycarbonylcyclopropyl]-trifluoro-boranuide (WZ5-E16784-076-B, 300 mg, 1.3 mmol; see PCT/FR2013/053057) to give the title compound as a mixture of cis isomers (280 mg, 53% yield). ESMS (m/z): 590 (M+1).

Preparation 14

1-[(1S,3R)-3-[[tert-Butyl(dimethyl)silyl]oxymethyl]-5-[cis-2-(2-hydroxy-2-methyl-propyl)cyclopropyl]-1-methyl-3,4-dihydro-1H-isoquinolin-2-yl]-2-(2,6-dichlorophenyl)ethanone Isomer 1 and

1-[(1S,3R)-3-[[tert-butyl(dimethyl)silyl]oxymethyl]-5-[cis-2-(2-hydroxy-2-methyl-propyl)cyclopropyl]-1-methyl-3,4-dihydro-1H-isoquinolin-2-yl]-2-(2,6-dichlorophenyl)ethanone Isomer 2

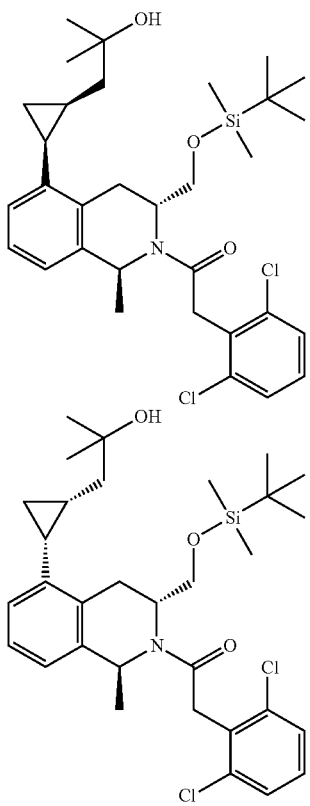

Using essentially the method described in Preparation 3, a mixture of cis-ethyl 2-[(1S,3R)-3-[[tert-butyl(dimethyl)silyl]oxymethyl]-2-[2-(2,6-dichlorophenyl)acetyl]-1-methyl-3,4-dihydro-1H-isoquinolin-5-yl]cyclopropanecarboxylate (280 mg, 0.5 mmol) and a 3M solution of methylmagnesium bromide in THF (2 mL, 6 mmol), with subsequent purification by flash chromatography on silica gel, using a gradient of 0-25% EtOAc in hexanes, gives the title compounds as separated cis isomers, 1-[(1S,3R)-3-[[tert-butyl(dimethyl)silyl]oxymethyl]-5-[cis-2-(2-hydroxy-2-methyl-propyl)cyclopropyl]-1-methyl-3,4-dihydro-1H-isoquinolin-2-yl]-2-(2,6-dichlorophenyl)ethanone Isomer 1 (110 mg, 38% yield) and 1-[(1S,3R)-3-[[tert-butyl(dimethyl)silyl]oxymethyl]-5-[cis-2-(2-hydroxy-2-methyl-propyl)cyclopropyl]-1-methyl-3,4-dihydro-1H-isoquinolin-2-yl]-2-(2,6-dichlorophenyl)ethanone Isomer 2 (65 mg, 23% yield) after solvent evaporation of the desired chromatographic fractions. ESMS (m/z) for each: 576 (M+1).

Preparation 15

4-[(1S,3R)-3-[[tert-Butyl(dimethyl)silyl]oxymethyl]-2-[2-(2-chloro-6-fluoro-phenyl)acetyl]-1-methyl-3,4-dihydro-1H-isoquinolin-5-yl]butan-2-one

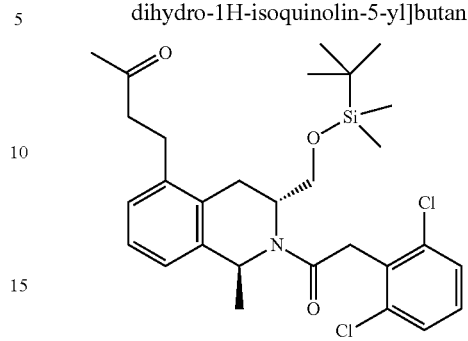

1-[(1S,3R)-5-Bromo-3-[[tert-butyl(dimethyl)silyl]oxymethyl]-1-methyl-3,4-dihydro-1H-isoquinolin-2-yl]-2-(2-chloro-6-fluoro-phenyl)ethanone (2 g, 3.7 mmol), tris(dibenzylideneacetone)dipalladium(0) (169 mg, 0.2 mmol) and di-tert-butyl-(1-phenylindol-2-yl)phosphane (187 mg, 0.55 mmol) are suspended in DMF (12.3 mL). N,N-dicyclohexylmethylamine (0.9 mL, 4 mmol) and but-3-en-2-ol (0.45 mL, 5.2 mmol) are added, and the mixture is degassed by bubbling with nitrogen for 10 min. The reaction vessel is sealed and heated to 100° C. for 1.5 h with stirring. The reaction mixture is cooled to RT and diluted with EtOAc. The organic layer is separated, washed with saturated aqueous NaCl, dried over $Na_2SO_4$, filtered, and concentrated under reduced pressure. The resulting residue is purified by flash chromatography on silica gel, using a gradient of 5-30% EtOAc in hexanes, to give the title compound as a white foam (1.5 g, 75% yield) after solvent evaporation of the desired chromatographic fractions. ESMS (m/z): 532 (M+1).

Preparation 16

1-((1S,3R)-3-(((tert-Butyldimethylsilyl)oxy)methyl)-5-((R)-4,4-difluoro-3-methyl-3-((trimethylsilyl)oxy)butyl)-1-methyl-3,4-dihydroisoquinolin-2(1H)-yl)-2-(2-chloro-6-fluorophenyl)ethan-1-one and 1-((1S,3R)-3-(((tert-Butyldimethylsilyl)oxy)methyl)-5-((S)-4,4-difluoro-3-methyl-3-((trimethylsilyl)oxy)butyl)-1-methyl-3,4-dihydroisoquinolin-2(1H)-yl)-2-(2-chloro-6-fluorophenyl)ethan-1-one

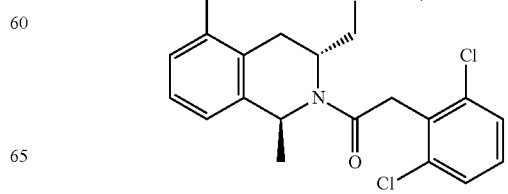

-continued

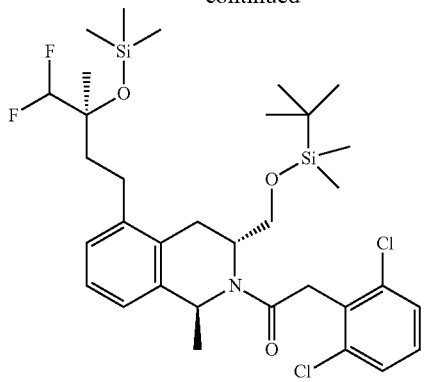

4-[(1S,3R)-3-[[tert-butyl(dimethyl)silyl]oxymethyl]-2-[2-(2-chloro-6-fluoro-phenyl)acetyl]-1-methyl-3,4-dihydro-1H-isoquinolin-5-yl]butan-2-one (580 mg, 1.1 mmol) and 18-crown-6 (29 mg, 0.1 mmol) are dissolved in 1,2-dimethoxyethane (5.5 mL). (Difluoromethyl)trimethylsilane (0.30 mL, 2 mmol) is added, followed by CsF (17 mg, 0.1 mmol). The mixture is heated to 60° C. and stirred overnight. Additional (difluoromethyl)trimethylsilane (0.30 mL, 2 mmol), 18-crown-6 (29 mg, 0.1 mmol) and CsF (17 mg, 0.1 mmol) are added and the reaction mixture is stirred at 60° C. for 4 h. The mixture is cooled to RT, diluted with EtOAc, and the separated organic extracts are washed with saturated aqueous NaCl. The organic layer is dried over Na$_2$SO$_4$, filtered, and the filtrated is concentrated under reduced pressure. The resulting residue is purified by flash chromatography on silica, using a gradient of 0-10% EtOAc in hexanes, to give a mixture of the title compounds as a white foam (493 mg, 68% yield) after solvent evaporation of the desired chromatographic fractions. ESMS (m/z): 656 (M+1).

Preparation 17

Methyl (Z)-2-(((benzyloxy)carbonyl)amino)-3-(2-bromo-3-fluorophenyl)acrylate

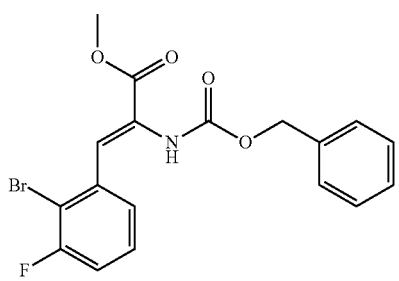 [SMILES: COC(=O)/C(=C/c1cccc(F)c1Br)NC(=O)OCc1ccccc1]

Methyl 2-(benzyloxycarbonylamino)-2-dimethoxyphosphoryl-acetate (25.5 g, 76.9 mmol) is dissolved in DCM (250 mL) and the solution is cooled to 0° C. 1,8-diazabicyclo[5.4.0]undec-7-ene (12 mL, 79.9 mmol) is added and the mixture is stirred for 30 min at 0° C. A solution of 2-bromo-3-fluoro-benzaldehyde (13.0 g, 64 mmol) in DCM (250 mL) is added slowly over 20 min at 0° C. The mixture is stirred at 0° C. for 2 h. The mixture is transferred to a separatory funnel and washed sequentially with saturated aqueous NH$_4$Cl solution (200 mL) and saturated aqueous NaCl (200 mL). The organic layer is dried over Na$_2$SO$_4$, filtered, and the filtrate is concentrated under reduced pressure to afford a white solid. The solid is recrystallized from hot EtOAc and collected by filtration, to provide the title compound as a white solid (25 g, 80% yield). ESMS (m/z): 407 (M+1).

Preparation 18

Methyl (R)-2-(((benzyloxy)carbonyl)amino)-3-(2-bromo-3-fluorophenyl)propanoate BMD-E17046-003

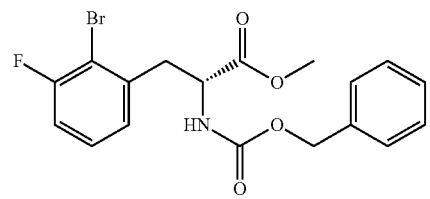 [SMILES: COC(=O)[C@@H](Cc1cccc(F)c1Br)NC(=O)OCc1ccccc1]

Inside a glove box, methyl (Z)-2-(((benzyloxy)carbonyl)amino)-3-(2-bromo-3-fluorophenyl)acrylate (26 g, 63.8 mmol) is added to an autoclave vessel containing MeOH (300 mL). [((R)-tert-Butylmethylphosphino)(di-tert-butylphosphino)amine](1,5-cyclooctadiene)rhodium(I) tetrafluoroborate (430 mg, 0.8 mmol) is added and the autoclave vessel is sealed and removed from the glove box. The mixture is flushed with H$_2$ gas for 15 seconds and pressurized to 100 psi H$_2$. The resulting mixture is stirred at RT for 15 h. The autoclave vessel is vented and the mixture is concentrated under reduced pressure to obtain the title compound as a white solid, suitable for use without further purification (26.3 g, 98% yield). ESMS (m/z): 410 (M+1).

To obtain an analytically pure sample, a portion of the crude product (66 mg) is purified by flash chromatography on silica gel, eluting with 15% EtOAc in hexanes, to give the product as a white solid after solvent evaporation of the desired chromatographic fractions. Chiral HPLC analysis (CHIRALCEL® OJ-H column, 0.2% isopropanol/MeOH, 1 mL/min): major enantiomer t$_R$: 2.981 min, minor enantiomer t$_R$: 3.557 min. Measured >99% ee.

Preparation 19

Methyl (R)-3-(2-bromo-3-fluorophenyl)-2-((methoxycarbonyl)amino)propanoate

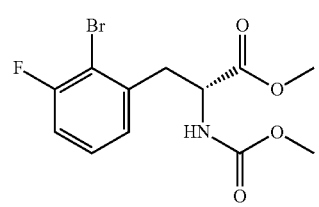 [SMILES: COC(=O)N[C@H](Cc1cccc(F)c1Br)C(=O)OC]

Methyl (R)-2-(((benzyloxy)carbonyl)amino)-3-(2-bromo-3-fluorophenyl)propanoate (21.25 g, 51.8 mmol) is dissolved in DCM (110 mL) and a 33% solution of HBr in acetic acid (28.1 mL, 155 mmol) is added. The resulting mixture is stirred at RT for 1 h. Water (100 mL) and DCM (100 mL) are added and the resulting mixture is stirred vigorously for 15 min. The organic layer is separated and discarded. DCM (200 mL) and Na₂CO₃ (35.1 g, 331.5 mmol) are added to the aqueous layer. Methyl chloroformate (5.2 mL) is added to the mixture and the resulting mixture is stirred at RT overnight. The mixture is extracted with DCM. The combined organic extracts are washed with saturated aqueous NaCl, dried over Na₂SO₄, filtered, and the filtrate is concentrated under reduced pressure to give the title as a white solid (13.6 g, 78% yield). ESMS (m/z): 333 (M+1).

Preparation 20

(R)-5-bromo-6-fluoro-1,2,3,4-tetrahydroisoquinoline-3-carboxylic acid hydrochloride

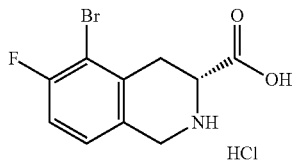

Methyl (R)-3-(2-bromo-3-fluorophenyl)-2-((methoxycarbonyl)amino)propanoate (17 g, 50.9 mmol) and paraformaldehyde (6.9 g, 76.4 mmol) are suspended in acetic acid (128 mL). The solution is cooled to 0° C. and concentrated H₂SO₄ (43 mL) is added. The resulting mixture is heated to 35° C. and stirred overnight. The reaction mixture is cooled to RT and poured into water (200 mL). The resulting suspension is extracted with EtOAc, and the combined organic extracts are washed with saturated aqueous NaCl, dried over Na₂SO₄, filtered, and the filtrate is concentrated under reduced pressure. The resulting residue is dissolved in concentrated HCl (231 mL) and the resulting mixture is heated to 120° C. in a round-bottom flask equipped with a reflux condenser overnight. The reaction mixture is cooled to RT and concentrated under reduced pressure at 50° C. The resulting residue is dried at 40° C. under vacuum for 18 h to give the title compound as a colorless solid (15 g, 94% yield). ESMS (m/z): 273 (M+1).

Preparation 21

(R)-(5-bromo-6-fluoro-1,2,3,4-tetrahydroisoquinolin-3-yl)methanol

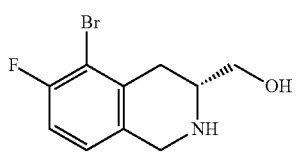

(R)-5-bromo-6-fluoro-1,2,3,4-tetrahydroisoquinoline-3-carboxylic acid hydrochloride (9.95 g, 32.0 mmol) is suspended in THF (80 mL) and the mixture is cooled to 0° C. A 1M solution of borane-tetrahydrofuran complex (96 mL, 96 mmol) is added slowly. The mixture is heated to 60° C. and stirred overnight. The reaction mixture is cooled to 0° C. and MeOH (20 mL) and saturated aqueous NH₄Cl solution (40 mL) are added and the mixture is stirred at RT for 10 min. Aqueous 5N HCl (60 mL) is added and the resulting mixture is heated to 45° C. for 4 h. the mixture is cooled to 0° C. and 21 wt % concentrated aqueous NH₄OH is added. The mixture is warmed to RT. The resulting mixture is extracted with 3:1 CHCl₃:isopropanol. The combined organic extracts are washed with saturated aqueous NaCl, dried over Na₂SO₄, filtered, and the filtrate is concentrated under reduced pressure to provide the title compound as a beige solid (9.5 g, 86% yield). ESMS (m/z): 259 (M+1).

Preparation 22

(R)-5-Bromo-3-(((tert-butyldiphenylsilyl)oxy)methyl)-6-fluoro-1,2,3,4-tetrahydroisoquinoline

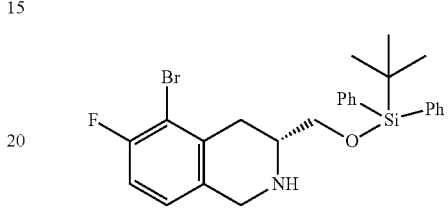

(R)-(5-Bromo-6-fluoro-1,2,3,4-tetrahydroisoquinolin-3-yl)methanol (12.6 g, 48.3 mmol) is dissolved in a mixture of DCM (185 mL) and DMF (146 mL). Imidazole (16.4 g, 241.5 mmol) and 4,4-dimethylaminopyridine (118 mg, 1 mmol) are added, followed by tert-butylchlorodiphenylsilane (13.8 mL, 53.1 mmol). The resulting mixture is stirred at RT for 1 h. MeOH (100 mL) is added and the mixture is stirred for an additional 1 h. Saturated aqueous NH₄Cl solution (200 mL) is added and the mixture is extracted with DCM. The combined organic extracts are washed with saturated aqueous NaCl, dried over Na₂SO₄, filtered, and the filtrate is concentrated under reduced pressure. The resulting residue is purified by flash chromatography on silica gel, eluting with a gradient of 2-50% EtOAc in hexanes, to give the title compound as oil (10.5 g, 45% yield) after solvent evaporation of the desired chromatographic fractions. ESMS (m/z): 498 M+1).

Preparation 23

(R)-5-Bromo-3-(((tert-butyldiphenylsilyl)oxy)methyl)-6-fluoro-3,4-dihydroisoquinoline

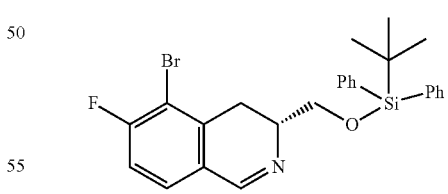

(R)-5-Bromo-3-(((tert-butyldiphenylsilyl)oxy)methyl)-6-fluoro-1,2,3,4-tetra-hydisoquinoline (10.9 g, 21.9 mmol) is dissolved in THF (200 mL) and N-chlorosuccinimide (4.4 g, 32.9 mmol) is added. The resulting mixture is stirred at RT for 40 min and concentrated under reduced pressure. The resulting residue is dissolve in 0.75M KOH in MeOH (100 mL) and stirred at RT for 30 min. The reaction mixture is diluted with water (50 mL) and extracted with DCM. The combined organic extracts are washed with saturated aqueous NaCl, dried over Na₂SO₄, filtered, and the filtrate is concentrated. The resulting residue is purified by flash chromatography on silica gel, eluting with a gradient of 5-50% EtOAc in hexanes, to obtain the title compound as colorless oil (9.63 g, 88% yield) after solvent evaporation of the desired chromatographic fractions. ESMS (m/z): 496 (M+1).

Preparation 24

(1S,3R)-5-Bromo-3-(((tert-butyldiphenylsilyl)oxy)methyl)-6-fluoro-1-methyl-1,2,3,4-tetrahydroisoquinoline

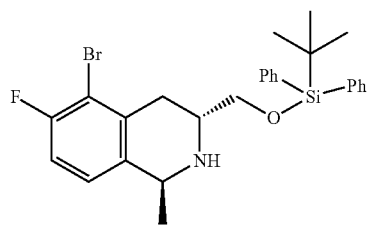 [SMILES: C[C@@H]1N[C@@H](CO[Si](c2ccccc2)(c2ccccc2)C(C)(C)C)Cc2c1ccc(F)c2Br]

(R)-5-Bromo-3-(((tert-butyldiphenylsilyl)oxy)methyl)-6-fluoro-3,4-dihydroisoquinoline (7.5 g, 15 mmol) is dissolved in tert-butyl methyl ether (190 mL) under nitrogen and the solution is cooled to −15° C. A 3M solution of methylmagnesium chloride in THF (20 mL, 60 mmol) is added dropwise with stirring, and the reaction mixture is warmed to RT and stirred for an additional 2 h. The mixture is cooled to 0° C. and MeOH (4 mL) and saturated aqueous NH₄Cl solution (4 mL) are added sequentially. The resulting mixture is extracted with DCM. The combined organic extracts are washed with saturated aqueous NaCl, dried over Na₂SO₄, filtered, and the filtrate is concentrated under reduced pressure. The resulting residue is purified by flash chromatography on silica gel, eluting with a gradient of 2-5% tert-butyl methyl ether in DCM, to give the title compound as yellow oil (1.7 g, 23% yield) after solvent evaporation of the desired chromatographic fractions. ESMS (m/z): 512 (M+1).

Preparation 25

1-[(1S,3R)-5-Bromo-3-[[tert-butyl(diphenyl)silyl]oxymethyl]-6-fluoro-1-methyl-3,4-dihydro-1H-isoquinolin-2-yl]-2-(2-chloro-6-fluoro-phenyl)ethanone

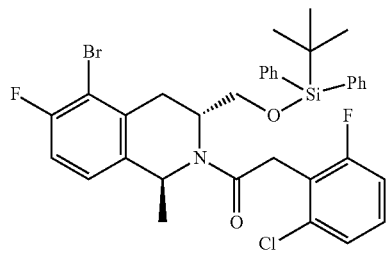 [SMILES: C[C@H]1c2ccc(F)c(Br)c2C[C@H](CO[Si](c2ccccc2)(c2ccccc2)C(C)(C)C)N1C(=O)Cc1c(F)cccc1Cl]

(1S,3R)-5-Bromo-3-(((tert-butyldiphenylsilyl)oxy)methyl)-6-fluoro-1-methyl-1,2,3,4-tetrahydroisoquinoline (5.2 g, 10.1 mmol) is dissolved in DMF (101 mL). 2-(2-Chloro-6-fluoro-phenyl)acetic acid (2.5 g, 13.2 mmol), 1-[bis(dimethylamino)methylene]-1H-1,2,3-triazolo[4,5-b]pyridinium 3-oxid hexafluorophosphate (5 g, 13.2 mmol) and DIPEA (8.8 mL, 50.6 mmol) are added sequentially, and the resulting mixture is stirred at RT overnight. Water (200 mL) is added and the mixture is extracted with EtOAc. The combined organic extracts are washed with saturated aqueous NaCl, dried over Na₂SO₄, filtered, and the filtrate is concentrated under reduced pressure. The resulting residue is purified by flash chromatography on silica gel, eluting with a gradient of 0-25% EtOAc in hexanes, to obtain the title compound as a white foam (6.3 g, 91% yield) after solvent evaporation of the desired chromatographic fractions. ESMS (m/z): 682 (M+1).

Preparation 26

1-[(1S,3R)-3-[[tert-Butyl(diphenyl)silyl]oxymethyl]-6-fluoro-5-(3-hydroxy-3-methyl-but-1-ynyl)-1-methyl-3,4-dihydro-1H-isoquinolin-2-yl]-2-(2-chloro-6-fluoro-phenyl)ethanone

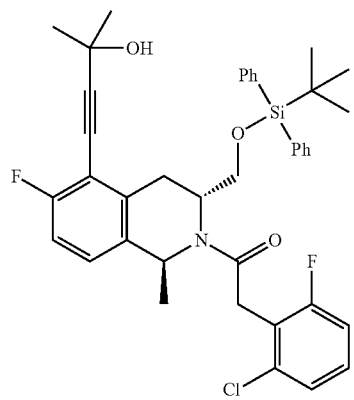 [SMILES: C[C@H]1c2ccc(F)c(C#CC(C)(C)O)c2C[C@H](CO[Si](c2ccccc2)(c2ccccc2)C(C)(C)C)N1C(=O)Cc1c(F)cccc1Cl]

1-[(1S,3R)-5-Bromo-3-[[tert-butyl(diphenyl)silyl]oxymethyl]-6-fluoro-1-methyl-3,4-dihydro-1H-isoquinolin-2-yl]-2-(2-chloro-6-fluoro-phenyl)ethanone (5.8 g, 8.5 mmol), tri-tert-butylphosphine(chloro)(crotyl)palladium(II) (675 mg, 1.7 mmol) and cuprous 2-thiophenecarboxylate (258 mg, 1.35 mmol) are added to a 500 mL round-bottom flask. The flask is evacuated and backfilled with nitrogen. DMF (60 mL), DIPEA (6 mL, 42.5 mmol), and 2-methylbut-3-yn-2-ol (4.1 mL, 42.2 mmol) are added. The reaction mixture is heated to 40° C. and stirred overnight. The mixture is cooled to RT, diluted with EtOAc, and the phases are separated. The organic layer is washed sequentially with water and saturated aqueous NaCl, dried over Na₂SO₄, filtered, and the filtrated is concentrated under reduced pressure. The resulting residue is purified by flash chromatography on silica gel, eluting with a gradient of 20-40% EtOAc in hexanes, to give the title compound as a white foam (5.4 g, 93% yield) after solvent evaporation of the desired chromatographic fractions. ESMS (m/z): 686 (M+1).

Preparation 27

1-[(1S,3R)-3-[[tert-butyl(diphenyl)silyl]oxymethyl]-6-fluoro-5-(3-hydroxy-3-methyl-butyl)-1-methyl-3,4-dihydro-1H-isoquinolin-2-yl]-2-(2-chloro-6-fluoro-phenyl)ethanone

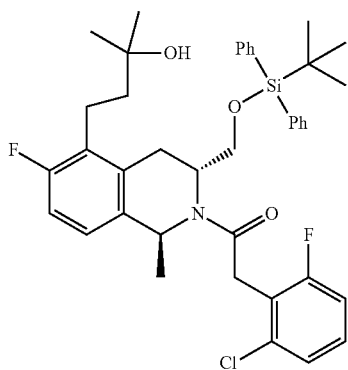 [SMILES: C[C@H]1c2ccc(F)c(CCC(C)(C)O)c2C[C@H](CO[Si](c2ccccc2)(c2ccccc2)C(C)(C)C)N1C(=O)Cc1c(F)cccc1Cl]

A Parr shaker is purged with nitrogen and 5 wt % sulfided platinum on carbon (2.5 g) is added. The vessel is purged again with nitrogen. EtOAc (50 mL) is added. A solution of 1-[(1S,3R)-3-[[tert-butyl(diphenyl)silyl]oxymethyl]-6-fluoro-5-(3-hydroxy-3-methyl-but-1-ynyl)-1-methyl-3,4-dihydro-1H-isoquinolin-2-yl]-2-(2-chloro-6-fluoro-phenyl)ethanone (5.4 g, 7.9 mmol) dissolved in EtOAc (50 mL) is added. The reaction vessel is purged with H₂ gas and pressurized to 60 psi H₂. The reaction mixture is shaken for 3 h at RT. Additional 5 wt % sulfided platinum on carbon (1.21 g) suspended in EtOAc (30 mL) is added, and the vessel is repressurize to 60 psi H₂. The reaction vessel is shaken for an additional 8 h. The vessel is depressurized and purged with nitrogen. The resulting suspension is filtered and the filtrate is concentrated under reduced pressure. The resulting residue is purified by flash chromatography on silica gel, eluting with a gradient of 0-100% EtOAc in hexanes (gradient 0-100%), to give the title compound as a white foam (5.33 g, 7.72 mmol) after solvent evaporation of the desired chromatographic fractions. MS (m/z): 690.4 (M+1).

Preparation 28 trans-Ethyl 2-((1S,3R)-3-(((tert-butyldiphenylsilyl)oxy)methyl)-2-(2-(2-chloro-6-fluorophenyl)acetyl)-6-fluoro-1-methyl-1,2,3,4-tetrahydroisoquinolin-5-yl)cyclopropane-1-carboxylate

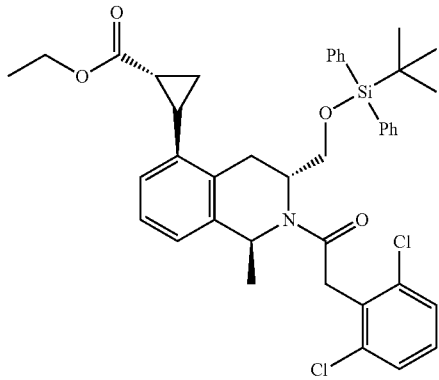

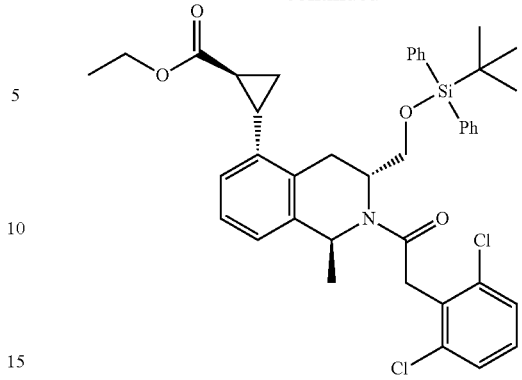

1-[(1S,3R)-5-Bromo-3-[[tert-butyl(diphenyl)silyl]oxymethyl]-6-fluoro-1-methyl-3,4-dihydro-1H-isoquinolin-2-yl]-2-(2-chloro-6-fluoro-phenyl)ethanone (665 mg, 1 mmol), rac-potassium [(trans-2-ethoxycarbonylcyclopropyl]-trifluoroborate (CAS #1612792-88-7; see PCT/FR2013/053057; Dec. 12, 2013) (257 mg, 1.2 mmol), di(1-adamantanyl)-n-butyl-phosphonium iodide (50 mg, 0.1 mmol), [(di(1-adamantyl)-butylphosphine)-2-(2'-amino-1,1'-biphenyl)]palladium(II) methanesulfonate (75 mg, 0.1 mmol) and Cs₂CO₃ (631 mg, 1.9 mmol) are suspended in a mixture of toluene (10 mL) and water (1 mL). The mixture is degassed with nitrogen for 5 min, and the vial is sealed and heated to 100° C. with stirring overnight. The reaction mixture is cooled to RT and diluted with EtOAc. The resulting mixture is washed sequentially with water, saturated aqueous NaHCO₃, water and saturated aqueous NaCl, and the layers are separated. The organic phase is dried over MgSO₄ and filtered, and the filtrate is concentrated under reduced pressure. The resulting residue is purified by flash chromatography on silica gel, eluting with a gradient of 0-100% ethyl tert-butyl ether in hexanes, to obtain a mixture of the title compounds as a yellow solid (448 mg, 61% yield) after solvent evaporation of the desired chromatographic fractions. ESMS (m/z): 716 (M+1).

Preparation 29

1-[(1R,3R)-3-[[tert-butyl(diphenyl)silyl]oxymethyl]-6-fluoro-5-[(trans-2-(1-hydroxy-1-methyl-ethyl)cyclopropyl]-1-methyl-3,4-dihydro-1H-isoquinolin-2-yl]-2-(2-chloro-6-fluoro-phenyl)ethanone

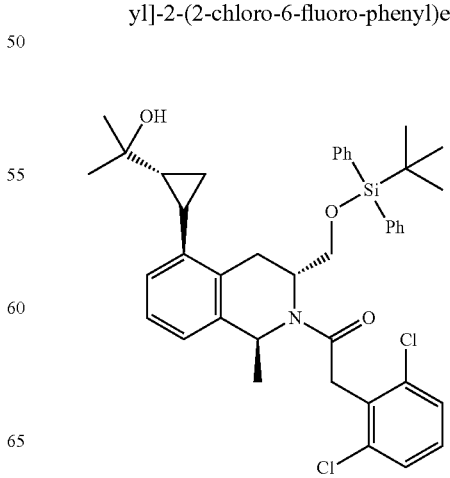

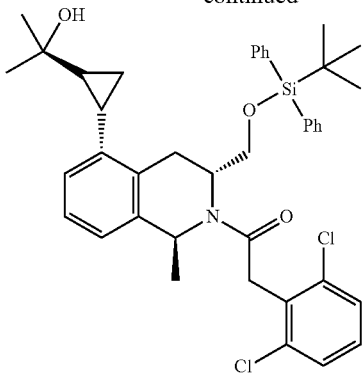

A mixture of trans-ethyl 2-((1S,3R)-3-(((tert-butyldiphenylsilyl)oxy)methyl)-2-(2-(2-chloro-6-fluorophenyl)acetyl)-6-fluoro-1-methyl-1,2,3,4-tetrahydroisoquinolin-5-yl)cyclopropane-1-carboxylate Isomer 1 and trans-ethyl 2-((1S,3R)-3-(((tert-butyldiphenylsilyl)oxy)methyl)-2-(2-(2-chloro-6-fluorophenyl)acetyl)-6-fluoro-1-methyl-1,2,3,4-tetrahydroisoquinolin-5-yl)cyclopropane-1-carboxylate Isomer 2 (440 mg, 0.6 mmol) is dissolved in THF (4 mL) and cooled to 0° C. A 1M solution of methylmagnesium bromide in THF (1.4 mL, 1.4 mmol) is added slowly over 10 min, and the resulting reaction mixture is warmed to RT and stirred overnight. The reaction mixture is cooled to 0° C. and additional 1M solution of methylmagnesium bromide in THF (1.4 mL, 1.4 mmol) is added. The reaction mixture is warmed to RT and stirred 8 h. The mixture is quenched with MeOH (130 μL) and stirred at RT overnight. The reaction mixture is diluted with EtOAc and the resulting solution is washed sequentially with saturated aqueous NaHCO₃, water, and saturated aqueous NaCl. The layers are separated, and the organic phase is dried over MgSO₄ and filtered. The filtrate is concentrated under reduced pressure. The resulting residue is purified by flash chromatography on silica gel, eluting with a gradient of 0-100% methyl tert-butyl ether in hexanes, to obtain a mixture of the title compounds as a yellow solid (245 mg, 42% yield) after solvent evaporation of the desired chromatographic fractions. ESMS (m/z): 702 (M+1).

Preparation 30

1-[(1S,3R)-5-bromo-3-[[tert-butyl(diphenyl)silyl]oxymethyl]-6-fluoro-1-methyl-3,4-dihydro-1H-isoquinolin-2-yl]-2-(2,6-dichlorophenyl)ethanone

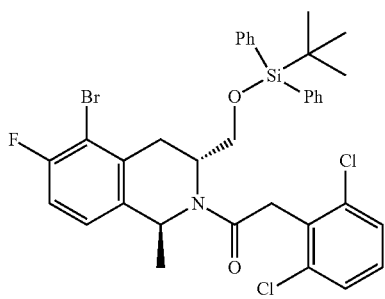 [SMILES: C[C@H]1c2ccc(F)c(Br)c2C[C@H](CO[Si](c2ccccc2)(c2ccccc2)C(C)(C)C)N1C(=O)Cc1c(Cl)cccc1Cl]

(1S,3R)-5-bromo-3-(((tert-butyldiphenylsilyl)oxy)methyl)-6-fluoro-1-methyl-1,2,3,4-tetrahydroisoquinoline (500 mg, 1 mmol), 2-(2,6-dichlorophenyl)acetic acid (260 mg, 1.3 mmol) and 1-[bis(dimethylamino)methylene]-1H-1,2,3-triazolo[4,5-b]pyridinium 3-oxid hexafluorophosphate (482 mg, 1.3 mmol) is suspended in DMF (10 mL). DIPEA (0.85 mL, 4.9 mL) is added and the mixture is stirred at RT for 72 h. The reaction mixture is diluted with EtOAc and washed sequentially with water and saturated aqueous NaCl. The layers are separated, and the organic layer is dried over Na₂SO₄, filtered, and the filtrate is concentrated under reduced pressure. The resulting residue is purified by flash chromatography on silica gel, eluting with a gradient of 5-15% EtOAc in hexanes, to give the title compound as a white foam (680 mg, 0.97 mmol) after solvent evaporation of the desired chromatographic fractions. ESMS (m/z): 698 (M+1).

Preparation 31 trans Ethyl 2-[(1S,3R)-3-[[tert-butyl(diphenyl)silyl]oxymethyl]-2-[2-(2,6-dichlorophenyl)acetyl]-6-fluoro-1-methyl-3,4-dihydro-1H-isoquinolin-5-yl]cyclopropanecarboxylate

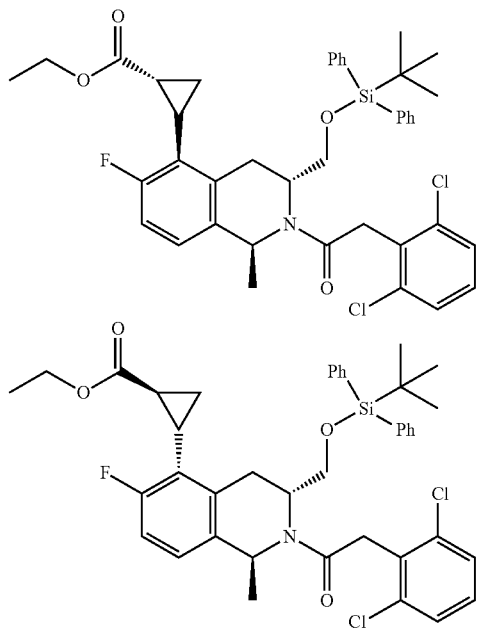

1-[(1S,3R)-5-bromo-3-[[tert-butyl(diphenyl)silyl]oxymethyl]-6-fluoro-1-methyl-3,4-dihydro-1H-isoquinolin-2-yl]-2-(2,6-dichlorophenyl)ethanone (604 mg, 0.9 mmol), rac-potassium [(trans-2-ethoxycarbonylcyclopropyl)]-trifluoroborate (CAS #1612792-88-7; see PCT/FR2013/053057; Dec. 12, 2013) (228 mg, 1 mmol), di(1-adamantanyl)-n-butyl-phosphonium iodide (44 mg, 0.1 mmol), [(di(1-adamantyl)-butylphosphine)-2-(2'-amino-1,1'-biphenyl)]palladium(II) methanesulfonate (66 mg, 0.1 mmol) and Cs₂CO₃ (565 mg, 1.7 mmol) are suspended in a mixture of toluene (10 mL) and water (1 mL). The resulting mixture is sparged with nitrogen for 5 min, the reaction is sealed, and the mixture is heated to 100° C. with stirring overnight. The reaction mixture is cooled to RT, diluted with EtOAc, and washed sequentially with water, saturated aqueous NaHCO₃, water, and saturated aqueous NaCl. The layers are separated, and the organic phase is dried over MgSO₄, filtered, and the filtrate is concentrated under reduced pressure. The resulting residue is purified by flash chromatography on silica gel, eluting with a gradient of 0-100% methyl tert-butyl ether in hexanes, to obtain the the title compounds as a mixture of trans diastereomers as a yellow solid (417 mg, 64% yield) after solvent evaporation of the desired chromatographic fractions. ESMS (m/z). 732 (M+1).

Preparation 32

1-[(1S,3R)-3-[[tert-butyl(diphenyl)silyl]oxymethyl]-6-fluoro-5-[trans-2-(1-hydroxy-1-methyl-ethyl)cyclopropyl]-1-methyl-3,4-dihydro-1H-isoquinolin-2-yl]-2-(2,6-dichlorophenyl)ethanone

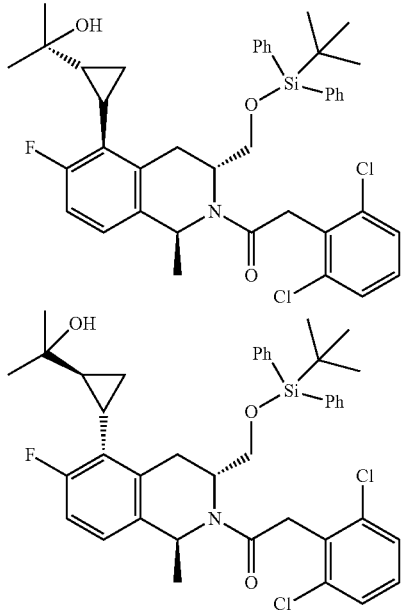

A mixture of trans ethyl 2-[(1S,3R)-3-[[tert-butyl(diphenyl)silyl]oxymethyl]-2-[2-(2,6-dichlorophenyl)acetyl]-6-fluoro-1-methyl-3,4-dihydro-1H-isoquinolin-5-yl]cyclopropanecarboxylate Isomer 1 and trans ethyl 2-[(1S,3R)-3-[[tert-butyl(diphenyl)silyl]oxymethyl]-2-[2-(2,6-dichlorophenyl)acetyl]-6-fluoro-1-methyl-3,4-dihydro-1H-isoquinolin-5-yl]cyclopropanecarboxylate Isomer 2 (405 mg, 0.6 mmol) is dissolved in THF (3 mL) and the mixture is cooled to 0° C. A 1M solution of methylmagnesium bromide in THF (2.8 mL, 2.8 mmol) is added slowly over 10 min and the reaction mixture is warmed to RT and stirred overnight. The reaction mixture is cooled to 0° C. and quenched with MeOH (220 µL). The reaction mixture is diluted with EtOAc and washed sequentially with water and saturated aqueous NaCl. The layers are separated, and the organic phase is dried over MgSO₄, filtered, and the filtrate is concentrated under reduced pressure. The resulting residue is purified by flash chromatography on silica gel, eluting with a gradient of 0-100% methyl tert-butyl ether in hexanes, to obtain the title compounds as a mixture of trans diastereomers as a yellow solid (336 mg, 55% yield) after solvent evaporation of the desired chromatographic fractions. ESMS (m/z): 718 (M+1).

Examples 1 and 2

2-(2,6-Dichlorophenyl)-1-[(1S,3R)-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 1 and 2-(2,6-Dichlorophenyl)-1-[(1S,3R)-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 2

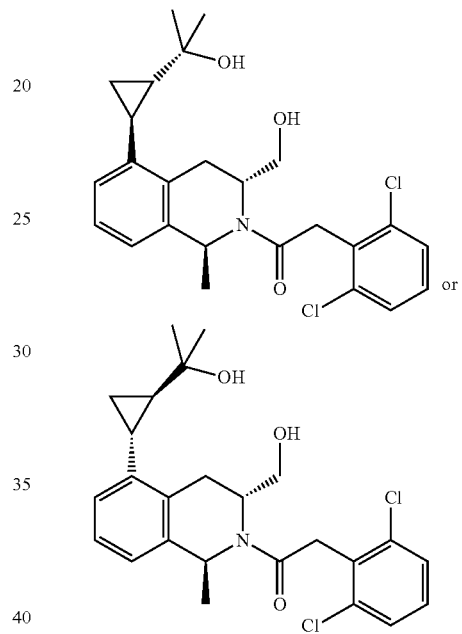

A 1M solution of tetrabutylammonium formate in THF (0.8 mL) is added to a solution of 1-[(1S,3R)-3-[[tert-butyl(dimethyl)silyl]oxymethyl]-5-[(trans-2-(2-hydroxy-2-methyl-propyl)cyclopropyl]-1-methyl-3,4-dihydro-1H-isoquinolin-2-yl]-2-(2,6-dichlorophenyl)ethanone (170 mg, 0.3 mmol) in THF (2.5 mL) and the resulting mixture is stirred for 30 min. The reaction mixture is concentrated under reduced pressure. The resulting residue is purified by flash chromatography on silica gel, eluting with a gradient of 0-65% EtOAc in hexanes with further purification by flash chromatography on silica gel, eluting with a gradient of 0-50% EtOAc in DCM, to give the title compound, 2-(2,6-Dichlorophenyl)-1-[(1S,3R)-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 2 (20 mg, 14% yield) after solvent evaporation of the desired chromatographic fractions. The mixed fractions from the additional flash chromatography are further purified by reversed phase chromatography on 18C silica gel, using a gradient of 5-95% water containing ammonium bicarbonate in acetonitrile to give the title compound, 2-(2,6-Dichlorophenyl)-1-[(1S,3R)-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 1 (26 mg, 18% yield) after solvent evaporation of the desired chromatographic fractions. ESMS (m/z) for each: 462 (M+1). $^1$H nmr (400 MHz, dmso-$d_6$) Isomer 1: δ 0.66-1.01 (m, 4H), 1.08-1.27 (m, 6H), 1.40-1.89 (m, 1H), 2.00-2.08 (m, 1H), 2.66-3.04 (m, 2H), 3.20-3.32 (m, 2H), 3.63-3.75 (m, 1H), 4.09-4.31 (m, 3H), 4.38-4.50 (m, 1H), 4.98-5.25 (m, 2H), 6.88-7.16 (m, 3H), 7.33 (t, 1H), 7.48 (d, 2H). $^1$H nmr (400 MHz, dmso-$d_6$) Isomer 2: δ 0.66-1.01 (m, 4H), 1.06-1.31 (m, 5H), 1.40-1.89 (m, 2H), 1.99-2.05 (m, 1H), 2.67-3.00 (m, 2H), 3.24-3.32 (m, 2H), 3.66-3.77 (m, 1H), 4.09-4.01 (m, 3H), 4.40-4.49 (m, 1H), 4.98-5.25 (m, 2H), 6.92-7.15 (m, 3H), 7.34 (t, 1H), 7.48 (d, 2H).

Examples 3 and 4

2-(2,6-Dichlorophenyl)-1-[(1S,3R)-3-(hydroxymethyl)-5-[cis-2-(1-hydroxy-1-methyl-ethyl)cyclopropyl]-1-methyl-3,4-dihydro-1H-isoquinolin-2-yl]ethenone, Isomer 1 and 2-(2,6-Dichlorophenyl)-1-[(1S,3R)-3-(hydroxymethyl)-5-[cis-2-(1-hydroxy-1-methyl-ethyl)cyclopropyl]-1-methyl-3,4-dihydro-1H-isoquinolin-2-yl]ethenone, Isomer 2

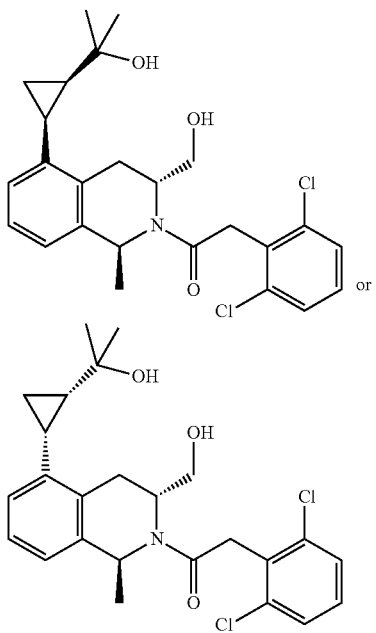

or

Using essentially the method described in Examples 1 and 2, using 1-[(1S,3R)-3-[[tert-butyl(dimethyl)silyl]oxymethyl]-5-[cis-2-(2-hydroxy-2-methyl-propyl)cyclopropyl]-1-methyl-3,4-dihydro-1H-isoquinolin-2-yl]-2-(2,6-dichlorophenyl)ethenone Isomer 1 (100 mg, 173 mmol) gives the title compound 2-(2,6-Dichlorophenyl)-1-[(1S,3R)-3-(hydroxymethyl)-5-[cis-2-(1-hydroxy-1-methyl-ethyl)cyclopropyl]-1-methyl-3,4-dihydro-1H-isoquinolin-2-yl]ethenone, Isomer 1 (61 mg, 76% yield). ESMS (m/z): 462 (M+1). $^1$H nmr (400 MHz, dmso-$d_6$) Isomer 1: δ 0.55 (s, 1H), 0.65 (s, 2H), 0.94-1.00 (m, 2H), 1.07-1.22 (m, 7H), 1.40-1.49 (m, 2H), 1.98-2.07 (m, 1H), 2.60-3.15 (m, 2H), 3.20-3.29 (m, 1H), 3.53-3.65 (m, 1H), 4.09-4.34 (m, 2H), 4.37-4.48 (m, 1H), 4.98-5.34 (m, 2H), 7.00-7.22 (m, 3H), 7.30-7.37 (m, 1H), 7.45-7.51 (m, 2H).

Using essentially the method described in Examples 1 and 2, using 1-[(1S,3R)-3-[[tert-butyl(dimethyl)silyl]oxymethyl]-5-[cis-2-(2-hydroxy-2-methyl-propyl)cyclopropyl]-1-methyl-3,4-dihydro-1H-isoquinolin-2-yl]-2-(2,6-dichlorophenyl)ethenone Isomer 2 (60 mg, 104 mmol), gives the title compound 2-(2,6-Dichlorophenyl)-1-[(1S,3R)-3-(hydroxymethyl)-5-[cis-2-(1-hydroxy-1-methyl-ethyl)cyclopropyl]-1-methyl-3,4-dihydro-1H-isoquinolin-2-yl]ethenone, Isomer 2, (42 mg, 87% yield). ESMS for each (m/z): 462 (M+1). $^1$H nmr (400 MHz, dmso-$d_6$) Isomer 1: δ 0.81 (s, 3H), 0.83-0.94 (m, 4H), 1.14-1.26 (m, 5H), 1.28-1.37 (m, 1H), 1.50 (d, 1H), 2.09-2.18 (m, 1H), 2.66-3.05 (m, 2H), 3.27-3.32 (m, 1H), 3.56-3.67 (m, 1H), 4.08-4.32 (m, 2H), 4.39-4.48 (m, 1H), 4.96-5.26 (m, 2H), 7.00-7.16 (m, 3H), 7.33 (t, 1H), 7.48 (d, 2H).

Examples 5 and 6

2-(2,6-Dichlorophenyl)-1-[(1S,3R)-5-[4,4-difluoro-3-hydroxy-3-methyl-butyl]-3-(hydroxymethyl)-1-methyl-3,4-dihydro-1H-isoquinolin-2-yl]ethenone, Isomer 1 and 2-(2,6-Dichlorophenyl)-1-[(1S,3R)-5-[4,4-difluoro-3-hydroxy-3-methyl-butyl]-3-(hydroxymethyl)-1-methyl-3,4-dihydro-1H-isoquinolin-2-yl]ethenone, Isomer 2

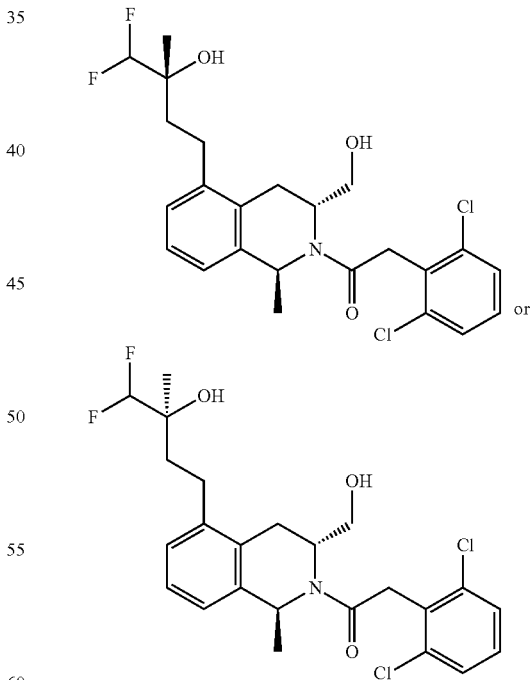

A mixture of 2-(2,6-dichlorophenyl)-1-[(1S,3R)-5-[(3R)-4,4-difluoro-3-hydroxy-3-methyl-butyl]-3-(hydroxymethyl)-1-methyl-3,4-dihydro-1H-isoquinolin-2-yl]ethanone and 2-(2,6-dichlorophenyl)-1-[(1S,3R)-5-[(3S)-4,4-difluoro-3-hydroxy-3-methyl-butyl]-3-(hydroxymethyl)-1-methyl-3,4-dihydro-1H-isoquinolin-2-yl]ethanone (493 mg, 0.75 mmol) is dissolved in THF (12 mL). A 1M solution of tetrabutylammonium fluoride in THF (3 mL, 3 mmol) is added and the resulting mixture is stirred at RT for 1 h. The mixture is diluted with EtOAc and washed with saturated aqueous NaCl. The organic layer is separated, dried over Na₂SO₄, filtered, and the filtrate is concentrated under reduced pressure. The resulting residue is purified by flash chromatography on silica gel, using a gradient of 0-75% EtOAc in hexanes, to give a mixture of the title as a white foam (342 mg, 97% yield) after evaporation of the desired chromatographic fractions. ESMS (m/z): 470 (M+1).

The two diastereomers are further purified and separated by chiral SFC (CHIRALCEL® OD-H column, 21×250 mm), eluting with methanol:CO₂ (15:85) at a flow rate of 80 mL/min and temperature of 40° C., to give Isomer 1 (156 mg, 46% yield) and Isomer 2 (141 mg, 41% yield) after solvent evaporation of the desired chromatographic fractions.

Isomer 1: ESMS (m/z): 470 (M+H). Analytical SFC $t_R$: 1.618 min (CHIRALCEL® OD-H column, 4×150 mm, 15% methanol/CO₂, 5 mL/min, 225 nm).

Isomer 2: ESMS (m/z): 470 (M+H). Analytical SFC $t_R$: 2.213 min (CHIRALCEL® OD-H column, 4×150 mm, 15% methanol/CO₂, 5 mL/min, 225 nm).

Example 7

2-(2-chloro-6-fluoro-phenyl)-1-[(1S,3R)-6-fluoro-3-(hydroxymethyl)-5-(3-hydroxy-3-methyl-butyl)-1-methyl-3,4-dihydro-1H-isoquinolin-2-yl]ethanone

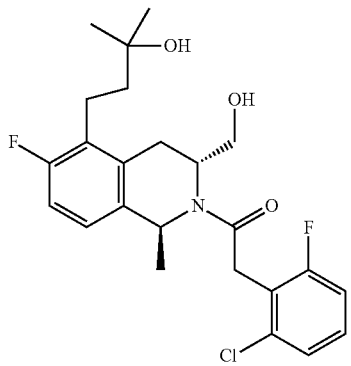 [SMILES: C[C@H]1c2ccc(F)c(CCC(C)(C)O)c2C[C@H](CO)N1C(=O)Cc1c(F)cccc1Cl]

1-((1S,3R)-3-(((tert-Butyldiphenylsilyl)oxy)methyl)-6-fluoro-5-(3-hydroxy-3-methylbutyl)-1-methyl-3,4-dihydroisoquinolin-2(1H)-yl)-2-(2-chloro-6-fluorophenyl) ethan-1-one (5.3 g, 7.7 mmol) is dissolved in THF (129 mL) and a 1M solution of tetrabutylammonium fluoride in THF (23 mL, 23 mmol) is added. The mixture is stirred at RT for 1 h. The mixture is diluted with EtOAc, washed with saturated aqueous NaCl, and the layers are separated. The organic extract is dried over Na₂SO₄, filtered, and the filtrate is concentrated under reduced pressure. The resulting residue is purified by flash chromatography on silica gel, eluting with a gradient of 50-100% EtOAc in hexanes, to obtain the title compound as a white solid (2.75 g, 79% yield) after solvent evaporation of the desired chromatographic fractions. ESMS (m/z): 452 (M+1).

Examples 8 and 9

2-(2-chloro-6-fluoro-phenyl)-1-[(1R,3R)-6-fluoro-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 1 and 2-(2-chloro-6-fluoro-phenyl)-1-[(1R,3R)-6-fluoro-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 2

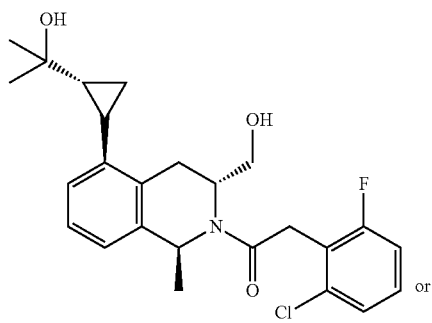

or

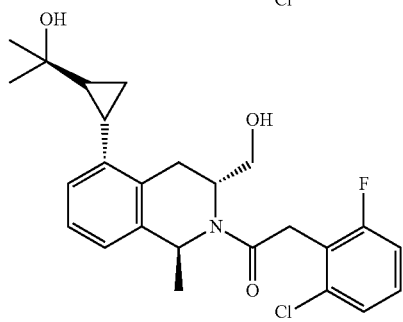

A mixture of 1-[(1R,3R)-3-[[tert-butyl(diphenyl)silyl]oxymethyl]-6-fluoro-5-[trans-2-(1-hydroxy-1-methyl-ethyl)cyclopropyl]-1-methyl-3,4-dihydro-1H-isoquinolin-2-yl]-2-(2-chloro-6-fluoro-phenyl)ethanone Isomer 1 and 1-[(1R,3R)-3-[[tert-butyl(diphenyl)silyl]oxymethyl]-6-fluoro-5-[trans-2-(1-hydroxy-1-methyl-ethyl)cyclopropyl]-1-methyl-3,4-dihydro-1H-isoquinolin-2-yl]-2-(2-chloro-6-fluoro-phenyl)ethanone Isomer 2 (1.1 g, 1.5 mmol) is dissolved in THF (10 mL) and the mixture is cooled to 0° C. A 1M solution of tetrabutylammonium fluoride in THF (3 mL, 3 mmol) is added dropwise and the reaction mixture is stirred while warming to RT overnight. The reaction mixture is diluted with EtOAc and washed sequentially with water and saturated aqueous NaCl. The resulting layers are separated, and the organic layer is dried over MgSO₄, filtered, and the filtrate is concentrated under reduced pressure. The resulting residue is purified by flash chromatography on silica gel, eluting with a gradient of 0-100% methyl tert-butyl ether in hexanes, to obtain a mixture of the title compounds as amber oil (490 mg, 69% yield) after solvent evaporation of the desired chromatographic fractions. ESMS (m/z): 464 (M+1).

The two diastereomers are further purified and separated by chiral SFC (PHENOMENEX® LUX® Cellulose-2 column, 21×250 mm, 20% isopropanol/CO₂, 80 mL/min, 40° C.) to obtain the 2-(2-chloro-6-fluoro-phenyl)-1-[(1R,3R)-

6-fluoro-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 1 (136 mg, 28% yield; analytical HPLC $t_R$: 2.769 min) and 2-(2-chloro-6-fluorophenyl)-1-[(1R,3R)-6-fluoro-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 2 (121 mg, 25% yield; analytical HPLC $t_R$: 3.368 min) as white solids after solvent evaporation of the desired chromatographic fractions.

Isomer 1: ESMS (m/z): 464 (M+H). $^1$H NMR (400 MHz, CDCl$_3$): δ 0.94-1.17 (m, 2H), 1.17-1.25 (m, 3H), 1.25-1.44 (m, 4H), 1.60 (s, 3H), 1.80-1.90 (m, 1H), 2.07-2.37 (m, 1H), 2.91-3.23 (m, 3H), 3.47-3.57 (m, 1H), 3.92 (t, J=16.1 Hz, 1H), 4.05 (s, 2H), 4.42-4.66 (m, 1H), 5.04 (q, J=7.0 Hz, 0.5H), 5.21 (q, J=7.0 Hz, 0.5H). 6.83-7.09 (m, 3H), 7.19-7.26 (m, 2H). Analytical SCF $t_R$ 2.769 min (PHENOMENEX® LUX® Cellulose-2 column, 4×150 mm, 20% isopropanol/CO$_2$, 5 mL/min, 225 nm).

Isomer 2: ESMS (m/z): 464 (M+H). $^1$H NMR (400 MHz, CDCl$_3$): δ 0.71-0.81 (m, 1H), 1.22 (s, 3H), 1.24 (s, 3H), 1.33-1.44 (m, 4H), 1.48-1.59 (m, 1H), 1.59-1.69 (m, 2H), 1.69-1.81 (m, 1H), 2.87-3.08 (m, 1H), 3.08-3.31 (m, 1H), 3.47-3.57 (m, 1H), 3.70-3.95 (m, 1H), 3.97-4.11 (m, 2H), 4.43-4.60 (m, 1H), 5.01-5.26 (m, 1H), 6.84-7.08 (m, 3H), 7.20-7.26 (m, 2H). Analytical SFC $t_R$ 3.368 min (PHENOMENEX® LUX® Cellulose-2 column, 4×150 mm, 20% isopropanol/CO$_2$, 5 mL/min, 225 nm).

Examples 10 and 11

2-(2,6-dichlorophenyl)-1-[(1S,3R)-6-fluoro-3-(hydroxymethyl)-5-[trans-(1-hydroxy-1-methyl-ethyl)cyclopropyl]-1-methyl-3,4-dihydro-1H-isoquinolin-2-yl]ethenone, Isomer 1 and 2-(2,6-dichlorophenyl)-1-[(1S,3R)-6-fluoro-3-(hydroxymethyl)-5-[trans-(1-hydroxy-1-methyl-ethyl)cyclopropyl]-1-methyl-3,4-dihydro-1H-isoquinolin-2-yl]ethenone, Isomer 2

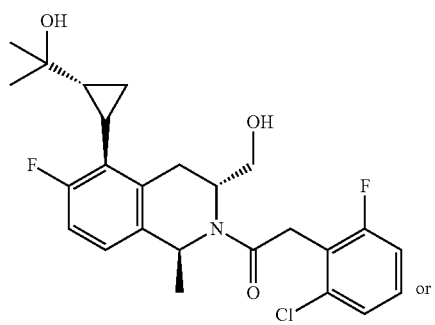

or

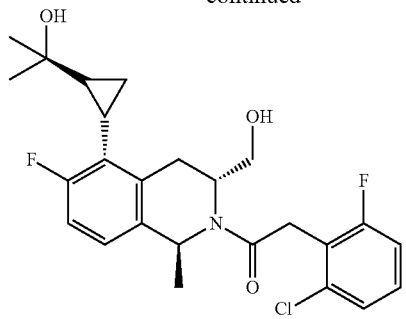

A mixture of 1-[(1S,3R)-3-[[tert-butyl(diphenyl)silyl]oxymethyl]-6-fluoro-5-[trans-2-(1-hydroxy-1-methyl-ethyl)cyclopropyl]-1-methyl-3,4-dihydro-1H-isoquinolin-2-yl]-2-(2,6-dichlorophenyl)ethanone Isomer 1 and 1-[(1S,3R)-3-[[tert-butyl(diphenyl)silyl]oxymethyl]-6-fluoro-5-[trans-2-(1-hydroxy-1-methyl-ethyl)cyclopropyl]-1-methyl-3,4-dihydro-1H-isoquinolin-2-yl]-2-(2,6-dichlorophenyl)ethanone Isomer 2 (333 mg, 0.5 mmol) is dissolved in THF (4.6 mL) and the mixture is cooled to 0° C. A 1M solution of tetrabutylammonium fluoride solution in THF (0.50 mL, 0.50 mmol) is added dropwise and the resulting reaction mixture is warmed to RT with stirring overnight. The reaction mixture is diluted with EtOAc and washed sequentially with water and saturated aqueous NaCl. The layers are separated, and the organic phase is dried over MgSO$_4$, filtered, and the filtrated is concentrated under reduced pressure. The resulting residue is purified by flash chromatography on silica gel, eluting with a gradient of 0-100% methyl tert-butyl ether in hexanes, to obtain a mixture of the title compounds as amber oil (211 mg, 72% yield) after solvent evaporation of the desired chromatographic fractions. ESMS (m/z): 480 (M+1).

The two diastereomers are further purified and separated by chiral SFC (PHENOMENEX® LUX® Cellulose-2 column, 21×250 mm, 20% IPA/CO$_2$, 80 mL/min, 40° C.) to obtain the title compounds 2-(2,6-dichlorophenyl)-1-[(1S,3R)-6-fluoro-3-(hydroxymethyl)-5-[trans-(1-hydroxy-1-methyl-ethyl)cyclopropyl]-1-methyl-3,4-dihydro-1H-isoquinolin-2-yl]ethenone, Isomer 1 (41 mg, 21% yield; analytical HPLC $t_R$: 3.095 min) and 2-(2,6-dichlorophenyl)-1-[(1S,3R)-6-fluoro-3-(hydroxymethyl)-5-[trans-(1-hydroxy-1-methyl-ethyl)cyclopropyl]-1-methyl-3,4-dihydro-1H-isoquinolin-2-yl]ethenone, Isomer 2 (47 mg, 24% yield; analytical HPLC $t_R$: 3.793 min) as white solids after solvent evaporation of the desired chromatographic fractions.

Isomer 1: ESMS (m/z): 480 (M+H). $^1$H NMR (400 MHz, CDCl$_3$): δ 0.92-1.07 (m, 2H), 1.20-1.27 (m, 5H), 1.60-1.66 (d, J=6.6 Hz, 1H), 1.80-1.90 (m, 1H). 2.93-3.23 (m, 2H), 3.47-3.60 (m, 1H), 3.81-4.00 (m, 1H), 4.23 (s, 2H), 4.44-4.70 (m, 1H), 5.06 (q, J=6.7 Hz, 0.5H), 5.23 (q, J=6.7 Hz, 0.5H), 6.84-7.04 (m, 2H), 7.16-7.23 (m, 1H), 7.36 (d, J=8.1 Hz, 2H). Analytical SFC $t_R$ 3.095 min (PHENOMENEX® LUX® Cellulose-2 column, 4.6×150 mm, 20% IPA/CO$_2$, 5 mL/min, 225 nm).

Isomer 2: ESMS (m/z): 480 (M+H). $^1$H NMR (400 MHz, CDCl$_3$): δ 0.70-0.83 (m, 1H), 1.09-1.18 (m, 1H), 1.23 (d, J=6.1 Hz, 1H), 1.32 (s, 3H), 1.35-1.46 (m, 4H), 1.64 (d, J=6.7 Hz, 2H), 1.69-1.82 (m, 1H), 2.90-3.10 (m, 1H), 3.16-3.37 (m, 1H), 3.50-3.61 (m, 1H), 3.70-4.00 (m, 1H), 4.23 (s, 2H), 4.48-4.63 (m, 1H), 5.09 (q, J=6.7 Hz, 0.6H), 5.24 (q, J=6.7 Hz, 0.4H), 6.85-7.05 (m, 2H), 7.15-7.23 (m, 1H), 7.36 (d, J=8.0 Hz, 2H). Analytical SFC $t_R$ 3.793 min (PHENOMENEX® LUX® Cellulose-2 column, 4.6×150 mm, 20% IPA/$CO_2$, 5 mL/min, 225 nm).

Human D1 Receptor PAM Assay

The PAM activity of the compounds of the present invention may be measured essentially as described in Svensson et al., An Allosteric Potentiator of the Dopamine D1 Receptor Increases Locomotor Activity in Human D1 Knock-in Mices without Causing Stereotypy or Tachyphylaxis. *J. Pharmacol. Exp. Ther.* (2017) 360:117-128.

More specifically, HEK293 cells that stably express the human D1 receptor (Accession number NM_000794) are generated by gene transduction using the pBABE-bleo retroviral vector and selected with Zeocin™ (InvivoGen). At approximately 80% confluency, the cells are harvested using TrypLE™ Express (Gibco), suspended in FBS plus 8% DMSO, and stored in liquid nitrogen. On the day of the assay, cells are thawed and resuspended in STIM buffer (Hanks Balanced Salt Solution supplemented with 0.1% BSA, 20 mM HEPES, 500 µM IBMX, and 100 µM ascorbic acid).

Test compound is serially diluted (1:2) with DMSO into assay plates (ProxiPlate-384 Plus, PerkinElmer) using acoustic dispensing (Labcyte) to provide 20 concentrations for full response curves. Test compound (80 nL) is added to 5 µL STIM buffer containing 2000 cells, and 5 µL of a 2× concentration dopamine solution in STIM buffer that will generate an $EC_{20}$ level response (24 nM in stock solution, or 12 nM final) and a final DMSO concentration in the well of 0.8%. Plates are incubated at room temperature for a total reaction time of 60 min.

cAMP production is quantified using HTRF® detection (Cisbio) according to the manufacturer's instructions. Generally, lysis buffer containing anti-cAMP cryptate (5 µL) and D2-conjugate (from HTRF® kit)(5 µL) is added to the wells, plates are incubated for an additional 60-90 min, and the time-resolved fluorescence is detected using an EnVision™ plate reader (PerkinElmer). Fluorescence data is converted to cAMP concentrations using a cAMP standard curve and analyzing using a 4-parameter non-linear logistic equation (Genedata Screener, version 13.0.5-standard). For potentiator mode concentration-response curves, results are expressed as percent of the window between a response at $EC_{20}$ concentration of dopamine alone (normalized to 0%) and the maximum response to dopamine (defined by response to 5 µM dopamine, final concentration, normalized as 100%). Absolute $EC_{50}$ values are calculated based on the maximum and minimum responses of the control agonist (dopamine). The % Potentiation (% Top) is determined from the fitted top of the concentration response curve. The absolute $EC_{50}$ and % Top for certain Example compounds are showed in the following Table 1:

TABLE 1

| Compound | Abs $EC_{50}$ (nM) (SEM, N) | % Top (SE, N) |
|---|---|---|
| 2-(2,6-Dichlorophenyl)-1-[(1S,3R)-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 2 | 8.28 (0.669, n = 3) | 96.4 (5.10, n = 3) |
| 2-(2,6-Dichlorophenyl)-1-[(1S,3R)-5-[4,4-difluoro-3-hydroxy-3-methyl-butyl]-3-(hydroxymethyl)-1-methyl-3,4-dihydro-1H-isoquinolin-2-yl]ethenone, Isomer 1 | 7.96 (1.66, n = 8) | 101 (2.79, n = 8) |
| 2-(2-chloro-6-fluoro-phenyl)-1-[(1R,3R)-6-fluoro-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 2 | 13.2 (3.03, n = 3) | 82.0 (6.80, n = 3) |
| 2-(2,6-dichlorophenyl)-1-[(1S,3R)-6-fluoro-3-(hydroxymethyl)-5-[trans-(1-hydroxy-1-methyl-ethyl)cyclopropyl]-1-methyl-3,4-dihydro-1H-isoquinolin-2-yl]ethenone, Isomer 2 | 5.19 (0.976, n = 3) | 92.7 (4.57, n = 3) |
| 2-(2-chloro-6-fluoro-phenyl)-1-[(1S,3R)-6-fluoro-3-(hydroxymethyl)-5-(3-hydroxy-3-methyl-butyl)-1-methyl-3,4-dihydro-1H-isoquinolin-2-yl]ethanone (Example 7) | 10.2 (1.40, n = 15) | 90.9 (2.69, n = 15) |
| 2-(2,6-Dichlorophenyl)-1-[(1S,3R)-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 1 | 12.1 (1.76, n = 3) | 94.2 (5.95, n = 3) |
| 2-(2,6-Dichlorophenyl)-1-[(1S,3R)-3-(hydroxymethyl)-5-[cis-2-(1-hydroxy-1-methyl-ethyl)cyclopropyl]-1-methyl-3,4-dihydro-1H-isoquinolin-2-yl]ethenone, Isomer 1 | 11.2 (2.27, n = 3) | 91.9 (3.95, n = 3) |
| 2-(2,6-Dichlorophenyl)-1-[(1S,3R)-3-(hydroxymethyl)-5-[cis-2-(1-hydroxy-1-methyl-ethyl)cyclopropyl]-1-methyl-3,4-dihydro-1H-isoquinolin-2-yl]ethenone, Isomer 2 | 86.7 (29.4, n = 3) | 93.2 (7.36, n = 3) |

TABLE 1-continued

| Compound | Abs EC$_{50}$ (nM) (SEM, N) | % Top (SE, N) |
|---|---|---|
| 2-(2,6-Dichlorophenyl)-1-[(1S,3R)-5-[4,4-difluoro-3-hydroxy-3-methyl-butyl]-3-(hydroxymethyl)-1-methyl-3,4-dihydro-1H-isoquinolin-2-yl]ethenone, Isomer 2 | 12.7 (1.83, n = 7) | 97.0 (3.44, n = 7) |
| 2-(2-chloro-6-fluoro-phenyl)-1-[(1R,3R)-6-fluoro-3-(hydroxymethyl)-5-[trans-2-(1-hydroxy-1-methyl-ethyl)cyclopropyl]-1-methyl-3,4-dihydro-1H-isoquinolin-2-yl]ethenone, Isomer 1 | 33.6 (7.85, n = 3) | 78.9 (1.43, n = 3) |
| 2-(2,6-dichlorophenyl)-1-[(1S,3R)-6-fluoro-3-(hydroxymethyl)-5-[trans-(1-hydroxy-1-methyl-ethyl)cyclopropyl]-1-methyl-3,4-dihydro-1H-isoquinolin-2-yl]ethenone, Isomer 1 | 12.3 (2.21, n = 3) | 86.9 (4.11, n = 3) |

The absolute EC$_{50}$ values provided for the above Example compounds in Table 1 illustrate the potentiation of human D1 receptor signaling in response to dopamine, and illustrate the activity of the compounds of Claim 1 as positive allosteric modulators of the human dopamine D1 receptor. Example compounds 1-6, and 8-11 of the present invention represent chiral compounds, and as described in the Examples herein, have been made and tested as individual stereoisomers. See Examples 1-6, 8-11, and Table 1 above. The combined data for individual stereoisomers (Abs EC$_{50}$ ranging from 5.6 nM to 86.7 nM for Examples 1-6, 8-11) demonstrate that each individual stereoisomer represents a D1 positive allosteric modulator embodiment of the present invention. The characterization and determination of the absolute stereochemistry of the individual stereoisomers of the Examples provided herein is within the skill of the art for the ordinary artisan, and methods for such determinations are well known in medicinal chemistry literature (See e.g *Chiral Analysis (Second Edition) Advances in Spectroscopy, Chromatography and Emerging Methods,* 2018). For example, absolute configurations are commonly determined by NMR on the basis of the use of CDAs: diastereomeric derivatives involving covalent binding between the chiral auxiliary and the enantiomeric substrates adopt a preferred conformation which can be predicted on the basis of the differential shielding that is caused by an aromatic ring incorporated into the chiral discriminating reagent.

Generation of Human D1 Receptor Knock-In Mouse

A transgenic mouse in which the murine dopamine 1 (D1) receptor is replaced by its human counterpart may be generated by standard techniques (see generally Svensson et al., *J. Pharmacol. Exp. Ther.* (2017) 360:117-128). For example, mouse genomic fragments are subcloned from the RP23 bacterial artificial chromosome library and recloned into a PGK-neo targeting vector. The mouse open reading frame is replaced with the human D1 receptor open reading frame in exon 2. A neo selection marker upstream of exon 2 is flanked by frt sites for later removal. The flanking of exon 2 by loxP selection sites allows for the option to generate D1 knock-out mice by crossing with mice expressing the cre nuclease gene.

The C57BL/6 N embryonic stem cell line B6-3 is grown on a mitotically inactivated feeder layer of mouse embryonic fibroblasts in high-glucose DMEM with 20% FBS and 2×10$^6$ unit/l leukemia inhibitory factor. Ten million embryonic stem cells plus 30 micrograms of linearized vector DNA are electroporated and subjected to G418 selection (200 µg/ml). Clones are isolated and analyzed by Southern blotting.

A clone containing the expected size insert is inserted into blastocysts and the resulting mice are genotyped by PCR. A male chimera is crossed with a female containing the flp nuclease gene to eliminate the selection marker. Progeny containing the human D1 receptor without the selection marker are identified by PCR. A male heterozygote is mated with female C57BL/6 mice. Male and female progeny containing the human D1 receptor are mated and homozygotes are identified by PCR. Behavior and reproduction of the homozygotes is found to be normal, and the colony is maintained in the homozygote state for succeeding generations.

Basal (Habituated) Locomotor Activity

The in vivo efficacy of the present compounds may be demonstrated to act through the D1 receptor using mouse locomotor activity. Locomotor activity is measured using an automated system to track movement in mice. Monitoring of mouse locomotor activity behaviors take place in transparent plastic shoebox cages having dimensions of 45×25×20 cm, with a 1 cm depth of wood chips for absorbent bedding, and covered with a ventilated filtered plastic cage top. Cages were placed in a rectangular frame containing a grid of 12 photocell beams in an 8×4 configuration (Kinder Scientific, Poway, CA) that is positioned 2.5 centimeters from the floor of the cage for the detection of body movements (ambulations) and recorded by computer.

Male human D1 receptor knock-in mice are placed in chambers and allowed to habituate to the chambers for 60 min. During the habituation period, the mice show decreasing locomotion over time, as expected. Following administration of a compound of the invention, animal movement is found to increase in a dose-dependent fashion.

The mice are randomly assigned to treatment groups. In the dose response study, each mouse is placed individually into one of the locomotor activity boxes for a 60 min. habituation period. The mice are then dosed orally using test compound in a 20% hydroxypropyl-betacyclodextrin vehicle and using a 10 mL/kg dose volume. After dosing, the mice are placed back into the LMA boxes and the total number of ambulations is recorded per 10 min interval for each mouse over a 60 min measurement period. Statistical analysis is carried out using one-way ANOVA followed by post-hoc analysis using Dunnett's Comparison test.

The compound of Example 7 is assayed essentially as described above and found to increase basal movement in a dose dependent manner (Table 2 below).

TABLE 2

| Example 7 (dose, mg/kg, PO) | Basal Locomotor Activity (Total Ambulations for 60 min) Means (SEM, % SE), N = 8/group |
|---|---|
| 0.0 (Vehicle - 20% hydroxypropyl-beta-cyclodextrin) | 421 (138, 33%) |
| 3.0 | 538 (101, 19%) |
| 6.0 | 1111 (410, 37%) |
| 10 | 1471*** (149, 10%) |
| 30 | 3937**** (393, 10%) |
| 60 | 4613**** (502, 11%) |

Statistical analysis is done on Total Ambulation data after Log10 Transformation. One-way ANOVA: **$p < 0.0001$, (Dunnett's Multiple Comparison Test: compared to Vehicle Control on log10 transformed data: *$p < 0.001$, ****$p < 0.0001$)

The Basal Locomotor Activity data for Example 7 shown in Table 2 illustrates that compounds of the invention, and Example 7 in particular, are effective in locomotor activation of animals that are habituated to the environment. This activity is believed to be the result of central activation of D1 receptors via allosteric potentiation (See e.g. Svensson et al., J. Pharmacol. Exp. Ther. (2017) 360:117-128). The data provided in Table 2 for Examples 7 illustrate the pharmacologically advantageous in vivo efficacy of the compounds of the invention for the potentiation of endogenous dopamine mediated responses. The data provided in Table 2 for Examples 7, further illustrates the pharmacologically advantageous oral bioavailabilitiy of Examples 7 and the compounds of formula I.

Plasma and Brain Levels

Example 7, 2-(2-chloro-6-fluoro-phenyl)-1-[(1S,3R)-6-fluoro-3-(hydroxymethyl)-5-(3-hydroxy-3-methyl-butyl)-1-methyl-3,4-dihydro-1H-isoquinolin-2-yl]ethenone, was orally dosed to male mouse from 3 mg/kg to 60 mg/kg in fed condition, and the plasma and brain concentration was determined 1 hr post-dose. The fraction unbound of the compound was determined in vitro as described previously (Zamek-Gliszczynski M J, et al., Validation of 96-well equilibrium dialysis with non-radiolabeled drug for definitive measurement of protein binding and application to clinical development of highly-bound drugs, J. Pharm. Sci. (2011) 100: 2498-2507). The ratio (Kpuu) of unbound brain concentration (Cu, brain) vs. unbound plasma concertation (Cu, plasma) was determined as described previously (Raub T J, et al., Brain Exposure of Two Selective Dual CDK4 and CDK6 Inhibitors and the Antitumor Activity of CDK4 and CDK6 Inhibition in Combination with Temozolomide in an Intracranial Glioblastoma Xenograft. Drug Metab. Dispos. (2015) 43:1360-71). The data presented below in Table 3 for Example 7 are averages from 3 animals at each dose. "Con." refers to concentration.

TABLE 3

| Dose mg/kg | Time hr | Plasma con. nM | Brain con. nM | fu, plasma | fu, brain | Cu, plasma nM | Cu, brain nM | Kpuu |
|---|---|---|---|---|---|---|---|---|
| 3 | 1 | 353 | 18 | 0.0141 | 0.0249 | 4.97 | 0.448 | 0.126 |
| 6 | 1 | 682 | 45.1 | 0.0141 | 0.0249 | 9.62 | 1.12 | 0.143 |
| 10 | 1 | 1210 | 84.9 | 0.0141 | 0.0249 | 17.1 | 2.11 | 0.122 |
| 30 | 1 | 4980 | 557 | 0.0141 | 0.0249 | 70.1 | 13.9 | 0.194 |
| 60 | 1 | 9080 | 1290 | 0.0141 | 0.0249 | 128 | 32.1 | 0.248 |

Compounds of the invention, for instance Example 7, 2-(2-chloro-6-fluoro-phenyl)-1-[(1S,3R)-6-fluoro-3-(hydroxymethyl)-5-(3-hydroxy-3-methyl-butyl)-1-methyl-3,4-dihydro-1H-isoquinolin-2-yl]ethenone, show an advantageous combination of pharmacological properties, such as potentiation of human D1 receptor signaling in response to dopamine, high oral in vivo availability, central nervous system availability, and in vivo efficacy in locomotor activation of animals that are habituated to the environment. For instance Example 7 demonstrates potentiation of human D1 receptor signaling in response to dopamine (10.2±1.40 nM (n=15)), and significant in vivo efficacy when orally administered at 10, 30, and 60 mg/kg PO, in locomotor activation of human D1 receptor knock-in mice that are habituated to the environment, illustrating the favorable oral bioavailability of this compound. Further, Example 7 is generally well tolerated when administered in vivo to normal rats over a broad dose range, and shows an advantageous lack of toxicity in this in vivo experiment. Thus, Example 7 demonstrates an advantageous combination of favorable pharmacological properties supporting possible use as an orally administered therapeutic agent for dopamine D1 receptor potentiaion, and treatment for Parkinson's disease, Schizophrenia, ADHD, and/or Alzheimer's disease.

Determination of Fraction of Compound Cleared Through CYP3A4 ($fm_{CYP3A4}$) Metabolism The fraction of overall clearance of a drug via oxidative metabolism by the cytochrome P450 (CYP) is an important indication for potential victim drug-drug interaction mediated adverse effects. (see generally Ogu, Chris C., and Maxa, Jan L., Drug interactions due to cytochrome P450, *BUMC Proceedings* 2000; 13:421-423.) The greater fraction of overall clearance for a given drug that goes though a CYP oxidation pathway, particularly exclusively through a single CYP, as for example CYP3A4, the greater the potential that the drug may be found susceptible to undesired victim drug-drug interactions when used in therapy. To determine the $fm_{CYP3A4}$ (the fraction of metabolism via CYP3A4), the fraction of P450-mediated oxidation, ($fm_{CYP}$) is first determined in human hepatocytes. The relative contribution of CYP3A4 mediated oxidation ($fm_{CYP3A4\_RCP}$) over other P450 s is then determined using a recombinant CYP phenotyping assay (RCP). The $fm_{CYP3A4}$ is calculated using the following equation:

$$fm_{CYP3A4} = fm_{CYP} \times fm_{CYP3A4\_RCP}$$

Determination of Fraction of Cytochrome P450 (CYP)-Mediated Oxidative Metabolism ($fm_{CYP}$) in Human Hepatocytes The relative contribution of P450 s in the overall metabolism of a compound was determined from the clearance of the drug in an assay using human hepatocytes in the presence and absence of the pan P450 inhibitor 1-aminobenzotriazole (ABT). The intrinsic clearance was determined in cryopreserved human hepatocytes essentially as described in McGinnity D F, et al. (2004) Evaluation of fresh and cryopreserved hepatocytes as in vitro drug metabolism tools for the prediction of metabolic clearance. *Drug Metab Dispos* 32:1247-1253. Generally, the assay incubations contain 0.3 µM test compound and $10^6$ cells/mL hepatocytes, with or without 0.5 hr. pre-incubation with ABT (1 mM). Parent compound loss is measured by LC/MS after 15, 30, 60 and 90 min. incubation. The intrinsic clearance (µL/min/$10^6$ cells) is calculated using the following equation for both ±ABT. The fraction of metabolism by CYP is the percentage of inhibition by ABT.

$$CL_{int} = -k_{dep} \times \text{incubation volume}/10^6 \text{ cells},$$

in which the $k_{dep}$, the substrate depletion constant (min$^{-1}$), is the slope determined using linear regression from the log transformed % remaining on the y-axis vs time on the x-axis (min$^{-1}$).

Determination of Fraction of CYP3A4-Mediated Metabolism Using a Recombinant CYP Phenotyping Assay ($Fm_{CYP3A4\_RCP}$)

The relative fraction of a compound's metabolism contributed by a given CYP, as for example CYP3A4, of the total P450 metabolism of the compound may be determined as follows:

A panel of 9 human recombinant CYPs (rCYPs) provided as Supersomes (BD Gentest, Woburn, MA), including rCYPs 1A2, 2B6, 2C8, 2C9, 2C19, 2D6, 2J2, 3A4, and 3A5, are evaluated for compound metabolism (see generally Cannady E A, et al. (2015) Evacetrapib: in vitro and clinical disposition, metabolism, excretion, and assessment of drug interaction potential with strong CYP3A and CYP2C8 inhibitors. *Pharmacol Res Perspect* 3:e00179). Incubations and calculations are performed essentially as described in Wickremsinhe E R, et al. (2014), Disposition and metabolism of LY2603618, a Chk-1 inhibitor following intravenous administration in patients with advanced and/or metastatic solid tumors. *Xenobiotica* 44:827-841, except that incubations are carried out for 2 hr., given the low turnover rate of the test compounds. Intrinsic clearance ($CL_{int}$) in rCYPs is scaled to human liver microsme (HLM-scaled $CL_{int}$) according to equation below:

$$\text{HLM-scaled } CL_{int} = -k_{dep} \times (\text{incubation volume/pmol } r CYP) \times RAF$$

in which $k_{dep}$ is the substrate depletion rate constant (min$^{-1}$), pmol rCYP is the lot-specific amount of rCYP in the incubation, and relative activity factor (RAF) is a relative activity factor (pmol/mg) appropriate for the rCYPs/HLMs pair. The rate constant is determined in-house by experiment, the slope determined using linear regression from the log transformed % remaining on the y-axis vs time on the x-axis (min$^{-1}$). pmol rCYP and RAF are vender supplied constenats for the supersome.

The fraction of CYP3A4-mediated metabolism ($fm_{CYP3A4\_RCP}$) is determined by dividing the HLM-scaled $CL_{int}$ of CYP3A4 by the sum of the HLM-scaled $CL_{1}n_{t}$ for each P450 subtype assayed (Cannady et al., 2015).

Hepatocyte Metabolite Profile

The hepatocyte metabolic profile is determined to confirm the formation of metabolites via P450-mediated oxidative and Phase II enzyme (e.g., UDP-glucuronosyltransferases and sulfotransferases) mediated non-oxidative pathways. It is determined in human hepatocytes essentially described in Zhou X, et al. (2016), Difference in the Pharmacokinetics and Hepatic Metabolism of Antidiabetic Drugs in Zucker Diabetic Fatty and Sprague-Dawley Rats. *Drug Metab Dispos* 44:1184-1192). In short, incubations are performed in a $CO_2$ incubator at 37° C. using a 24-well plate containing 250,000 cells/well. A stock solution of test compound is added to medium to give a final incubation concentration of 2 µM. The incubations including the media and cells are quenched with an equal volume of acetonitrile after 4 hr. Samples are processed and analyzed using LC/MS essentially as presented in Zhou et al. 2016.

Calculation of Fraction of Compound Cleared Through CYP3A4 Metabolism ($Fm_{CYP3A4}$)

The renal and biliary excretion of test compounds is tested in bile-duct cannulated dogs essentially according to Burkey J L, et al. (2002) Disposition of LY333531, a selective protein kinase C beta inhibitor, in the Fischer 344 rat and beagle dog. *Xenobiotica* 32:1045-1052. The compound of Example 7 is tested essentially as described and its renal and biliary excretion is found to be negligible. The fraction of compound cleared through CYP3A4 metabolism is calculated using the equation below:

$$fm_{CYP3A4} = fm_{CYP} \times fm_{3A4\_RCP}$$

where $fm_{CYP}$ is the fraction of compound metabolized via CYP measured in hepatocyte $CL_{int} \pm ABT$ assay
$fm_{3A4\_RCP}$ is the fraction of compound metabolized via CYP3A4 in recombinant CYP phenotyping assay Determination of Fraction Escaping First-Pass Gut Metabolism ($F_G$)

The estimation of fraction metabolized in the gut may be determined using the following equation found in Yang J, et al. (2007) Prediction of intestinal first-pass drug metabolism. *Curr Drug Metab* 8:676-684:

$$F_G = Q_{gut}/(Q_{gut} + fu_{gut} \times Cl_{int\,CYP3A,gut})$$

$$Q_{gut} = Q_{villi} \times Cl_{perm}/(Q_{villi} + Cl_{perm})$$

$$Cl_{perm} = P_{app} \times \text{Intestinal surface area}$$

$$Cl_{int,CYP3A,gut} = CL_{int,CYP3A,liver}/fu_{mic} \times \text{microsomal protein in gut } (mg) \times 0.4 \text{ (in house calculation)}$$

Where $Q_{gut}$ is a hybrid flow term dependent upon the villous blood flow and permeability of the compound
$fu_{gut}$ is the fraction of drug unbound in the enterocyte
$Q_{villi}$ is villous blood flow
$Cl_{perm}$ is the clearance term defining permeability through the enterocyte
$P_{app}$ is the passive permeability measured in MDCKII cell line in house
$fu_{mic}$ is the fraction of drug unbound in human liver microsomes Human intestine parameters are from Yang et al., 2007, and Gertz M, et al. (2010) Prediction of human intestinal first-pass metabolism of 25 CYP3A substrates from in vitro clearance and permeability data. *Drug Metab Dispos* 38:1147-1158.

Mechanistic Static Model for Estimation of Victim DDI by CYP3A4 Inhibition

The potential change in drug AUC exposure magnitude of test compounds in the presence of itraconazole may be determined by employing a mechanistic static model essentially as described in Han B, et al. (2013) Prediction of CYP3A Mediated Drug-Drug Interactions: Estimation of Gut Wall and Hepatic Contributions. *ASCPT Annual Meeting*, Indianapolis, IN:

$$AUC_{PO,inh}/AUC_{PO} = [1/(A \times fm + (1-fm))] \times [1/(X \times (1-F_G) + F_G)]$$

$$A = 1/(1+[I]_h/Ki)$$

$$X = 1/(1+[I]_{gut}/Ki)$$

Where fm is fraction metabolized by hepatic CYP3A4
$F_G$ is fraction that escapes intestinal metabolism in enterocytes
Ki is the dissociation constant of itraconazole from the enzyme
$[I]_h$ is the concentration of itraconazole in the liver
$[I]_{gut}$ is the concentration of itraconazole in gut The parameters of itraconazole as CYP3A4 inhibitor (A=0.10 and X=0.10) are from Olkkola K T, et al. (1994) Midazolam should be avoided in patients receiving the systemic antimycotics ketoconazole or itraconazole. *Clin Pharmacol Ther* 55:481-485.

The compound of Examples 7, representative of compounds of intervention is tested essentially as described above and is found to be primarily metabolized through non-oxidative processes in the hepatocytes as opposed to through oxidative metabolism by P450 (fractions metabolized by CYPs being 32.3%). The compound was not examined in RCP assay, but the worst-case senarior of 100% metabolized by CYP3A4 was assumed for predicting AUC ratio in the presence of itraconazole. The predicted AUC ratio was less than 2. Thus, the compounds of the invention are believed to present minimal victim drug-drug interaction risk via any CYP, including CYP3A4 (See Table 4.).

TABLE 4

$fm_{CYP3A4}$, $F_G$ and predicted AUC ratio for the compounds of Ex. 7

| Compound | | Ex. 7 |
|---|---|---|
| $fm_{CYP}$ | | 0.322 |
| $fm_{3A4\_RCP}$ | | 1 |
| $fm_{CYP3A4}$ | | 0.322 |
| $CL_{int,\,CYP3A,\,liver}$ | µl/min/mg | 25.5 |
| $fu_{mic}$ | | 0.392 |
| $P_{app}$ | $10^{-6}$ cm/s | 37.9 |
| $F_G$ | | 0.78 |
| Predicted AUC ratio (with itraconazole) | | 1.76 |

We claim:

1. A compound of the formula:

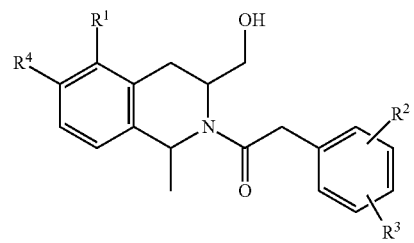

wherein:
$R^1$ is

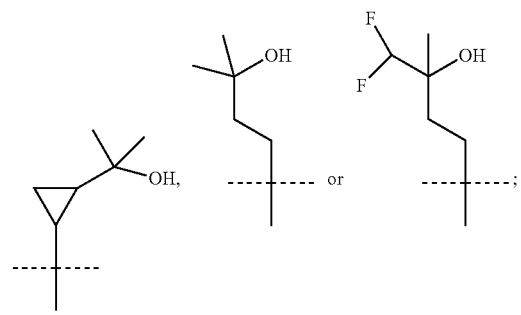

R² is —F or —Cl;
R³ is —F or —Cl; and
R⁴ is —H or —F;
  provided that when R¹ is

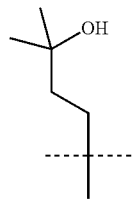

then R4 is —F.

2. The compound according to claim 1 of formula:

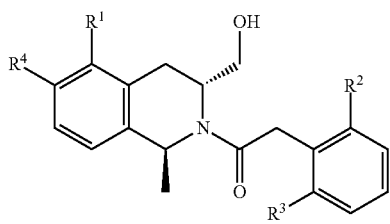

wherein:
R¹ is

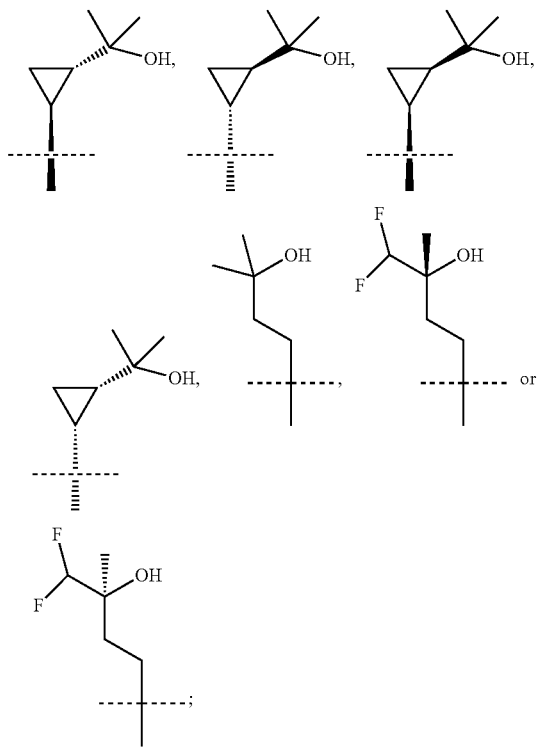

R² is —F or —Cl;
R³ is —F or —Cl; and
R⁴ is —H or —F;
  provided that when R¹ is

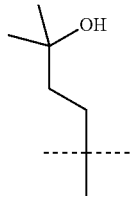

then R⁴ is —F.

3. The compound according to claim 1 which is:

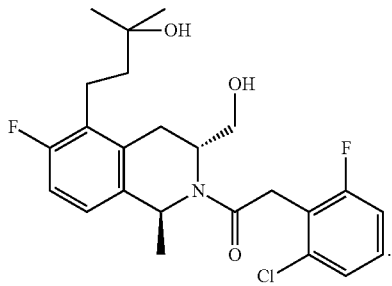 [SMILES: C[C@H]1c2ccc(F)c(CCC(C)(C)O)c2C[C@H](CO)N1C(=O)Cc1c(F)cccc1Cl]

4. A pharmaceutical composition comprising a compound according to claim 1, and a pharmaceutically acceptable carrier, diluent or excipient.

5. A pharmaceutical composition according to claim 4 comprising:

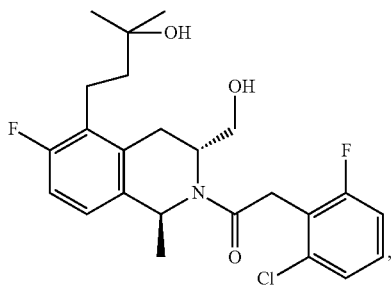 [SMILES: C[C@H]1c2ccc(F)c(CCC(C)(C)O)c2C[C@H](CO)N1C(=O)Cc1c(F)cccc1Cl]

and a pharmaceutically acceptable carrier, diluent or excipient.

6. A method of treating a dopaminergic CNS disorder comprising administering to a patient in need thereof an effective amount of a compound which is 2-(2-chloro-6-fluoro-phenyl)-1-[(1S,3R)-6-fluoro-3-(hydroxymethyl)-5-(3-hydroxy-3-methyl-butyl)-1-methyl-3,4-dihydro-1H-isoquinolin-2-yl]ethanone wherein the dopaminergic CNS disorder is Parkinson's disease or Alzheimer's disease.

7. The method of claim 6, wherein the dopaminergic CNS disorder is Parkinson's disease.

8. The method of claim 6, wherein the dopaminergic CNS disorder is Alzheimer's disease.

9. A method of treating a dopaminergic CNS disorder comprising administering to a patient in need thereof a compound of claim 1 in simultaneous, separate, or sequential combination with a dopamine precursor wherein the dopaminergic CNS disorder is Parkinson's disease or Alzheimer's disease.

10. The method of claim 9, wherein the dopaminergic CNS disorder is Parkinson's disease.

11. The method of claim 9, wherein the dopaminergic CNS disorder is Alzheimer's disease.

12. A method of treating a dopaminergic CNS disorder comprising administering to a patient in need thereof a compound of claim 1 in simultaneous, separate, or sequential combination with a dopamine agonist wherein the dopaminergic CNS disorder is Parkinson's disease or Alzheimer's disease.

13. The method of claim 12, wherein the dopaminergic CNS disorder is Parkinson's disease.

14. The method of claim 12, wherein the dopaminergic CNS disorder is Alzheimer's disease.

\* \* \* \* \*